(12) United States Patent
Cruz et al.

(10) Patent No.: US 7,751,814 B2
(45) Date of Patent: *Jul. 6, 2010

(54) SYSTEM FOR MANAGING CALL HANDOFFS BETWEEN AN AIRCRAFT AND MULTIPLE CELL SITES

(75) Inventors: Joseph M. Cruz, Naperville, IL (US); Harold Grant Saroka, Ashburn, VA (US); Ivica Kostanic, Palm Bay, FL (US); Anand K. Chari, Bartlett, IL (US)

(73) Assignee: Aircell LLC, Itasca, IL (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/414,873

(22) Filed: May 1, 2006

(65) Prior Publication Data

US 2006/0276127 A1 Dec. 7, 2006

Related U.S. Application Data

(60) Division of application No. 11/241,109, filed on Sep. 30, 2005, now Pat. No. 7,107,062, which is a continuation-in-part of application No. 10/730,329, filed on Dec. 7, 2003, now Pat. No. 7,113,780, which is a continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180, which is a continuation-in-part of application No. 08/960,183, filed on Oct. 29, 1997, now Pat. No. 6,108,539, which is a continuation-in-part of application No. 08/709,417, filed on Sep. 6, 1996, now Pat. No. 5,878,346, which is a continuation-in-part of application No. 08/027,333, filed on Mar. 8, 1993, which is a continuation-in-part of application No. 07/847,920, filed on Mar. 6, 1992, now Pat. No. 5,557,656.

(51) Int. Cl.
*H04W 4/00* (2009.01)

(52) U.S. Cl. ...................... 455/431; 455/12.1

(58) Field of Classification Search ............ None
See application file for complete search history.

(56) References Cited

U.S. PATENT DOCUMENTS

| 5,212,804 | A | 5/1993 | Choate |
| 5,432,841 | A | 7/1995 | Rimer |
| 5,555,444 | A | 9/1996 | Diekelman et al. |
| 5,590,395 | A | 12/1996 | Diekelman |
| 5,651,050 | A | 7/1997 | Bhagat et al. |
| 5,740,535 | A | 4/1998 | Rune |
| 5,754,959 | A | 5/1998 | Ueno et al. |
| 5,956,644 | A | 9/1999 | Miller et al. |
| 6,009,330 | A | 12/1999 | Kennedy, III et al. |
| 6,690,928 | B1 | 2/2004 | Konishi et al. |
| RE40,476 | E * | 9/2008 | Leuca et al. ............ 370/316 |
| 2002/0155833 | A1 | 10/2002 | Borel |

(Continued)

OTHER PUBLICATIONS

Casewell, I.E.; "The Provision of GSM Cellular Radio Environments With Passenger Aircraft Operating Over Europe"; IEEE Fifth International Conference; Dec. 11-14, 1989; pp. 172-176.

*Primary Examiner*—Ajit Patel
(74) *Attorney, Agent, or Firm*—Patton Boggs LLP

(57) ABSTRACT

The handoff management system maximizes the communications capacity available from terrestrial air-to-ground cellular networks, while also integrating communications capabilities from satellite air-to-ground cellular networks and terrestrial cellular communications networks. The communications capacity is maximized by dynamically allocating communications from the aircraft over multiple communications channels to multiple cells of the terrestrial air-to-ground cellular network, and to satellite air-to-ground cellular networks and terrestrial mobile networks. This approach effectively provides an increase in the call handling capacity available to any aircraft and permits a gradual transition of communications from one cell to the next cell, rather than requiring an abrupt handover of all traffic from the aircraft from one cell to the next cell.

12 Claims, 14 Drawing Sheets

U.S. PATENT DOCUMENTS

| | | |
|---|---|---|
| 2004/0203918 A1 | 10/2004 | Moriguchi et al. |
| 2005/0053026 A1* | 3/2005 | Mullan et al. ............... 370/316 |
| 2005/0071076 A1 | 3/2005 | Baiada et al. |
| 2006/0229070 A1* | 10/2006 | de La Chapelle et al. ... 455/431 |
| 2007/0021117 A1* | 1/2007 | McKenna et al. ............ 455/431 |
| 2007/0111725 A1* | 5/2007 | Kauffman et al. ............ 455/431 |
| 2008/0039076 A1* | 2/2008 | Ziarno et al. ................. 455/431 |
| 2009/0080368 A1* | 3/2009 | Bengeult et al. ............ 370/316 |

* cited by examiner

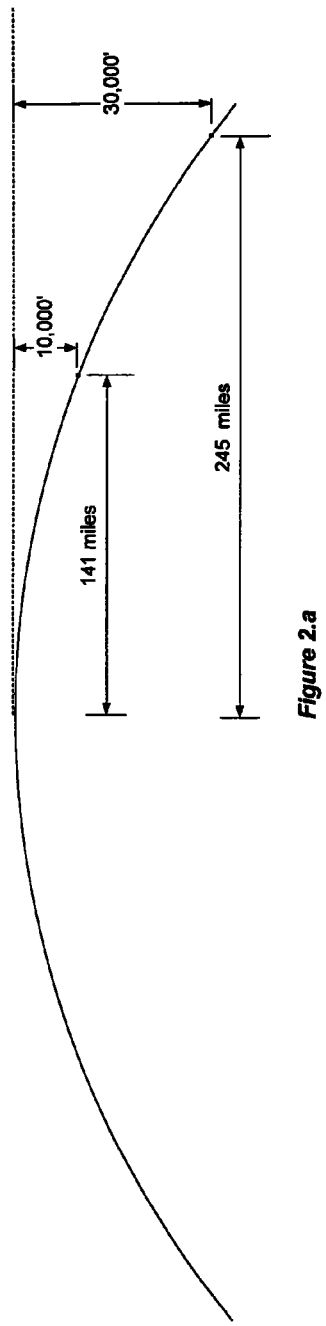
Figure 2.a
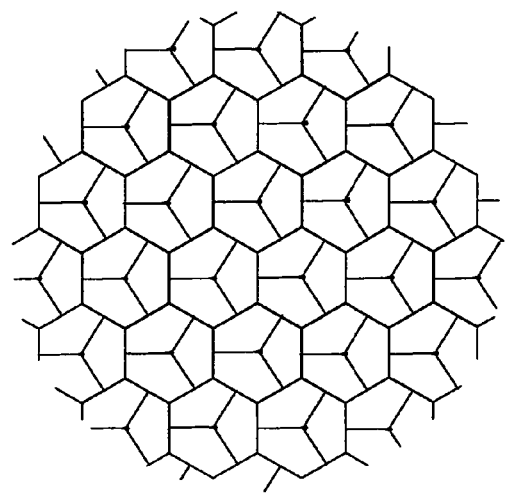
Figure 2.c
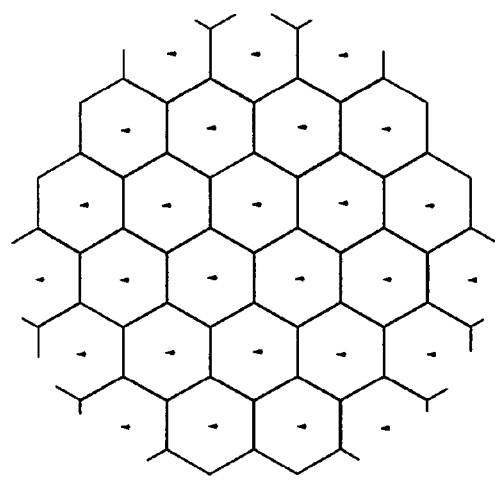
Figure 2.b

SYSTEM FOR MANAGING CALL HANDOFFS BETWEEN AN AIRCRAFT AND MULTIPLE CELL SITES

CROSS-REFERENCE TO RELATED APPLICATIONS

This application is a division of U.S. patent application Ser. No. 11/241,109 filed Sep. 30, 2003 and titled "System For Managing Call Handoffs Between An Aircraft And Multiple Cell Sites, which is a continuation-in-part of U.S. patent application Ser. No. 10/730,329 filed Dec. 7, 2003 and titled "System for Integrating an Airborne Wireless Cellular Network with Terrestrial Wireless Cellular Networks and the Public Switched Telephone Network," which is a continuation-in-part of U.S. patent application Ser. No. 09/686,923 filed Oct. 11, 2000, now U.S. Pat. No. 6,788,935 issued Sep. 7, 2004 titled "Aircraft-Based Network for Wireless Subscriber Stations," which is a continuation-in-part of U.S. patent application Ser. No. 09/379,825 filed Aug. 24, 1999, now U.S. Pat. No. 6,408,180 issued Jun. 18, 2002 and titled "Ubiquitous Subscriber Station," which is a continuation-in-part of U.S. patent application Ser. No. 08/960,183 filed Oct. 9, 1997, now U.S. Pat. No. 6,108,539 issued Aug. 22, 2000 and titled "Non-Terrestrial Subscriber Station," which is a continuation-in-part of U.S. patent application Ser. No. 08/709,417 filed Sept. 6, 1996, now U.S. Pat. No. 5,878,346 issued Mar. 2, 1999 and titled "Multi-Dimensional Mobile Cellular Communication Network," which is a continuation-in-part of U.S. patent application Ser. No. 08/027,333 filed Mar. 8, 1993 now U.S. Pat. No. 5,444,762 issued Aug. 22, 1995 and titled "Method and Apparatus for Reducing Interference Among Cellular Telephone Signals" and U.S. patent application Ser. No. 07/847,920 filed March 6, 1992, now U.S. Pat. No. 5,557,656 issued Sept. 17, 1996 and titled "Mobile Communications."

BACKGROUND OF THE INVENTION

1. Field of the Invention

This invention relates to cellular communications and, in particular, to a system that enables wireless subscriber stations that are located in an aircraft to receive consistent wireless communication services in both the terrestrial (ground-based) and non-terrestrial (airborne) regions via the management of call handoffs among cells as the aircraft traverses the coverage area of these cells.

2. Problem

It is a problem in the field of wireless communications to efficiently and continuously meet the communications requirements of multiple aircraft as the aircraft fly their routes and approach/depart airports.

A typical air-to-ground cellular communications network consists of a number of ground stations, each of which provides a radio frequency coverage area in a predetermined volume of space radially arranged around the cell site transmitting antenna, using an antenna pattern which is insensitive to the reception of ground-originating or ground reflected signals and which antenna pattern is transmissive only in a skyward direction. The ground stations are geographically distributed, generally following a cellular network layout. The coverage area of each ground station is substantially contiguous with that of neighboring sites, so that the composite coverage of all of the ground stations in the cellular communications network generally provides coverage over the targeted area. Ground stations may provide either a single cell of coverage using transceiver(s) associated with a single transmit and receive antenna system or multiple cells of coverage, each with associated transceivers and transmit and receive antennas. The advantage of the latter arrangement, with multiple cells per ground station is to allow provision of increased call handling capacity in the coverage area of that ground station.

There are limitations on the total radio frequency spectrum available, and therefore limitations on the total available call handling capacity in any single cell. As a wireless communications device moves from the coverage area of one cell into the coverage area of a contiguous cell, the communications from that wireless communications device are handed over from the first cell to the second cell. This requires that there be adequate available call handling capacity in the second cell to support the new load represented by this wireless communications device. Call handoffs that entail a single wireless communications device do not create large transient loads on a cell. However, in an air-to-ground system, the number of presently active cellular calls within an aircraft may represent a large fraction of the call handling capacity of a terrestrial air-to-ground cell. In addition, aircraft arrivals and departures from the coverage area of a cell are infrequent. With the small number of aircraft that can be served by a cell and long average transit times for aircraft within a cell, there must be a large allowance of idle capacity to serve aircraft which may arrive before the presently served aircraft leave the cell and free up call handling capacity within the cell.

There is therefore a need for an improved method of managing the air-to-ground cellular communications from aircraft in order to provide increased communications capacity while meeting service objectives. The management of call handoffs among cells as the aircraft traverses the coverage area of these cells is critical to meeting the communications requirements of multiple aircraft as the aircraft fly their routes and approach/depart airports.

BRIEF SUMMARY OF THE INVENTION

The above-described problems are solved and a technical advance achieved in the field by the present system for managing call handoffs between an aircraft and multiple cell sites, termed "handoff management system" herein. The handoff management system maximizes the communications capacity available from terrestrial air-to-ground cellular networks, while also integrating communications capabilities from satellite air-to-ground cellular networks and terrestrial cellular communications networks.

The communications capacity is maximized by dynamically allocating communications from the aircraft over multiple communications channels to multiple cells of the terrestrial air-to-ground cellular network, and to satellite air-to-ground cellular networks and terrestrial mobile networks. This approach effectively provides an increase in the call handling capacity available to any aircraft and permits a gradual transition of communications from one cell to the next cell, rather than requiring an abrupt handover of all traffic from the aircraft from one cell to the next cell. In addition, the handoff management system allocates the communications with the aircraft as a function of the various types of communications (data, voice, control data) to optimize the allocation of types of communications by considering the characteristics of the serving network including: cost, bandwidth, signal delay, transmission technology, and the like, against the requirements of the call traffic.

Terrestrial air-to-ground cellular networks are generally optimized to provide service to aircraft which are either flying at cruising altitudes, or which are in arrival or departure patterns from an airport. Such networks may not be able to provide adequate communications service while the aircraft is on the ground without compromising the quality or call handling capacity provided to aircraft in the air. Therefore, it may be preferable to provide communications service to the aircraft using an alternative network while the aircraft is on the ground or near the ground. To achieve these goals, the handoff management system communicates with multiple networks, including: terrestrial air-to-ground cellular networks, satellite air-to-ground cellular networks, and terrestrial networks to select the most appropriate communications capability, based upon multiple factors including the availability, economics, and performance capabilities of the various networks for which the aircraft has appropriate access equipment. In addition, the handoff management system simultaneously utilizes more than one of the available communications capabilities, with the portion of the communications directed to each network being determined by the performance requirement of the traffic contained in that portion of the communications. This is accomplished by providing communications services to an aircraft using an "outer network" comprising base stations and switching equipment, and an "inner network" which provides transport capabilities between the outer network elements located onboard the aircraft, and the terrestrially located outer network elements. The inner network provides a broadband bidirectional air-to-ground channel which carries all subscriber traffic, signaling and administrative data relating to the provision of services in the aircraft (also termed "feature set data"), typically using multiple virtual channels for each of the subscriber traffic and the signaling and administrative data.

In this manner, the handoff management system maximizes the capacity available from terrestrial air-to-ground systems, while also integrating communications capabilities from satellite air-to-ground systems and terrestrial cellular communications systems.

BRIEF DESCRIPTION OF THE DRAWINGS

FIGS. 2A-2C illustrate various aspects of the radio frequency management of an air-to-ground cellular network;

DETAILED DESCRIPTION OF THE INVENTION

Cellular wireless communication systems provide the service of connecting wireless communication customers, each having a wireless subscriber device (or wired subscriber device, such as a connection to a Local Area Network on the aircraft), to both land-based customers who are served by the common carrier public telephone network as well as other wireless communication customers. In such a system, if the traffic is circuit switched, all incoming and outgoing calls are routed through Mobile Telephone Switching Offices (MTSOs), each of which is connected to a plurality of cell sites, which communicate with wireless subscriber devices located in the areas covered by the cell sites.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between wireless subscriber devices and the transmitter-receiver pairs as well as the nature of the data transferred there between, be it voice, video, telemetry, computer data, and the like, are not limitations to the system which is described herein, since a novel system concept is disclosed, versus a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Figure 1:
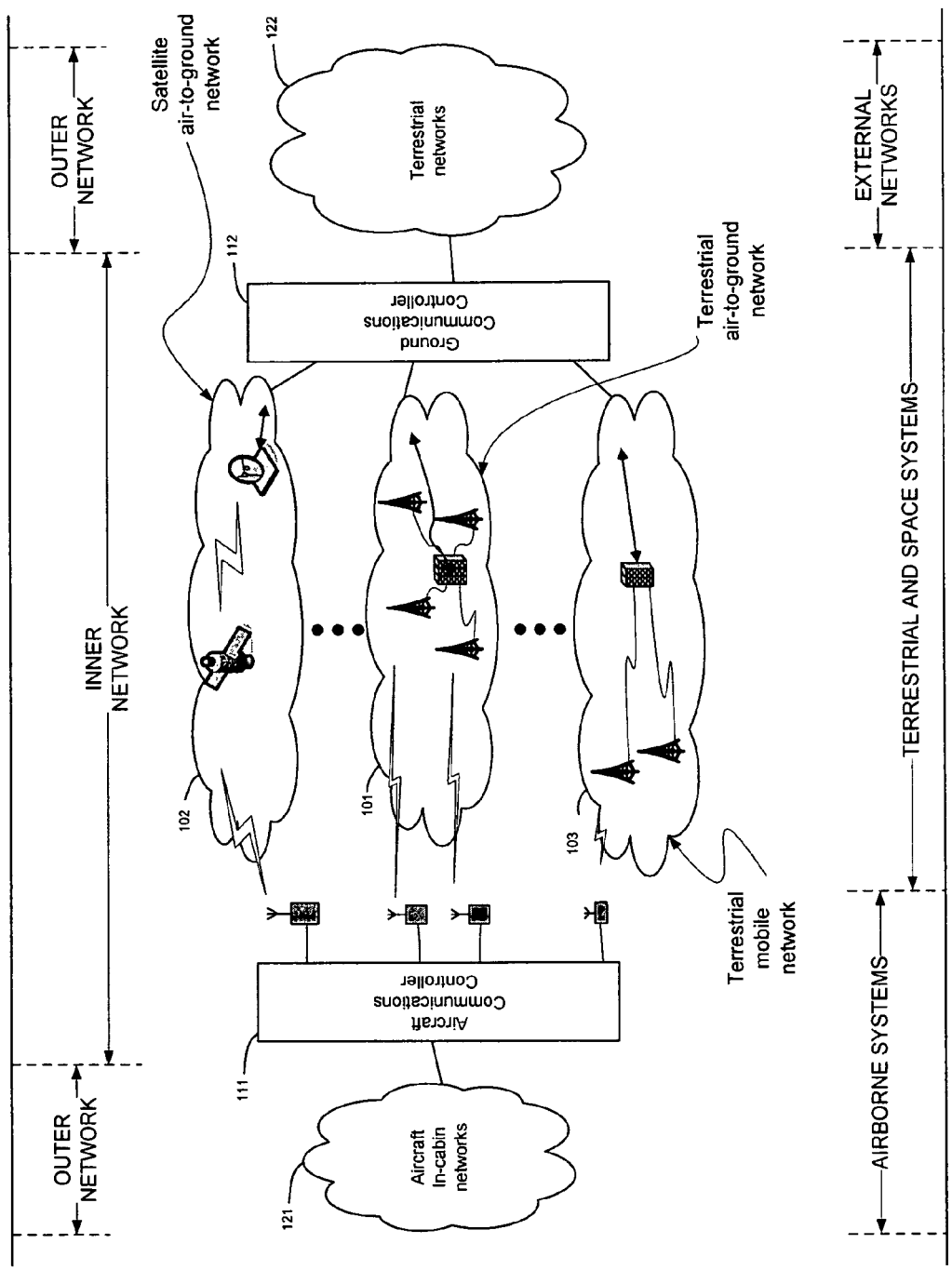
FIG. 1 illustrates, in block diagram form, the overall architecture of a composite air-to-ground cellular network that interconnects an Aircraft In-Cabin Network with a Ground-Based Communication Network.

FIG. 1 illustrates, in block diagram form, the overall architecture of a composite air-to-ground cellular network that interconnects an Aircraft In-Cabin Network with a Ground-Based Communication Network. This is accomplished by the Inner Network transmitting both the subscriber traffic (comprising voice and/or other data) as well as signaling and administrative data relating to the provision of services in the aircraft (feature set data) between the Aircraft in-Cabin Network 3 and the Ground-Based Communication Network 1 to thereby enable the wireless subscriber devices that are located in the aircraft to receive consistent wireless communication services in both the terrestrial (ground-based) and non-terrestrial regions.

Air-to-Ground Cellular Network

The Air-to-Ground cellular network 2 shown in FIG. 1 is based on wireless communications (radio frequency or optical) between the ground-based cellular communications network and the wireless subscriber devices that are located in the aircraft, with the preferred approach being that of a radio frequency connection. This radio frequency connection takes on the form of a cellular topology where typically more than one cell describes the geographic footprint or coverage area of the composite Air-to-Ground cellular network 2. The air-to-ground connection carries both subscriber traffic and at least one of network signaling and administrative data on separate concurrently available logical channels.

Alternatively, the Air-to-Ground cellular network 2 could be achieved through a wireless satellite connection where radio frequency links are established between the aircraft and a satellite and between the satellite and the Ground-Based Communication Network respectively. These satellites could be geosynchronous (appears to be stationary from an earth reference point) or moving, as is the case for Medium Earth Orbit (MEO) and Low Earth Orbit (LEO). Examples of satellites include but are not limited to: Geosynchronous Ku Band satellites, DBS satellites (Direct Broadcast Satellite), the Iridium system, the Globalstar system and the Inmarsat system. In the case of specialized satellites, such as those used for Direct Broadcast Satellite, the link is typically unidirectional, that is from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to aircraft include broad or wide area links such as HF (High Frequency) radio and more unique systems such as troposcatter architectures.

In this manner, true feature set transparency is achieved for the wireless communication devices located on the aircraft. The Air-to-Ground cellular network 2 can be viewed as the conduit through which the subscriber traffic as well as the network feature set data is transported between the traditional Ground-Based Communication Network 1 and the Aircraft in-Cabin Network 3. The Air-to-Ground cellular network 2 can be implemented as a single radio frequency link or multiple radio frequency links, with a portion of the signals being routed over different types of links, such as the Air-to-Ground Link and the Satellite Link. Thus, there is a significant amount of flexibility in the implementation of this system, using the various components and architectural concepts disclosed herein.

The overall network architecture of the handoff management system consists of an Inner Network which works with an Outer Network. The Outer Network contains the architectural elements that are specific to the services and features provided to the aircraft passengers, crew and various aircraft systems. The Inner Network serves to provide transport services between the airborne and terrestrial elements of the Outer Network. The various network elements of the Outer Network are functionally similar to those that would/could be used to provide an entirely terrestrial service capability, with some adaptations required to be suitable for air-to-ground purposes. This allows the Outer Network elements to be entirely compatible with passenger and crew devices that are compliant with existing terrestrial standards. Similarly, the Outer Network elements which interface to various other networks (voice and data switches, VLR/HLRs, signaling equipment, etc.) are largely indistinguishable from network elements performing similar functions for terrestrial applications.

The Inner and Outer Networks interface digitally, in the preferred embodiment using IP protocols. The Inner Network, in order to establish priorities for transport of data relating to various services, must only be "aware" of the service quality metrics and relative importance of the various sorts of communications traffic to/from the Outer Network. Voice traffic, for instance, has lower tolerance to latency and jitter than data traffic to a PDA and communications that are security related may have higher priority than any other communications. The communications requirements of a particular service are determined by the Inner Network in a conventional manner, such as: i) determined by the physical ports used for interconnecting network elements, ii) identified by data embedded in IP data packet header, or iii) communicated over signaling channels.

An aircraft may be equipped to be served by a variety of Inner Network communications alternatives. For example, a terrestrial air-to-ground system 101 can be the primary air-to-ground communications capability. Some aircraft could be equipped with multiple terrestrial air-to-ground systems to permit provision of services from multiple sources. Satellite air-to-ground cellular network 102 communications capabilities may also be provided, and provide transport services when terrestrial air-to-ground cellular networks are unavailable, or when an alternative service capability is desired to reduce the load on the terrestrial air-to-ground service. An additional alternative maybe terrestrial cellular networks 103, which may used to provide services to aircraft that are located on the ground, or, with any appropriate network modifications, may provide service to airborne aircraft.

Terrestrial Air-to-Ground Cellular Networks

Terrestrial air-to-ground cellular networks are generally designed using many of the same architectural features as terrestrial cellular communications networks. A network of ground stations is designed to provide overlapping coverage, so that the overall network is capable of providing service throughout the network, utilizing handoffs as an aircraft moves between the coverage areas of adjacent cells. Ground station antenna systems maybe designed using directional antennas, each equipped with a transceiver or set of transceivers, in order to provide distinct coverage cells, much as similar arrangements are utilized in terrestrial cellular communication systems.

The coverage capability of a ground station is primarily limited by the geometry of the radio path between the ground station antennas and the aircraft antennas, relative to the earth's curvature. The relationship between the distance to the radio horizon (D) as a function of the altitude of the aircraft antenna (ha) and the elevation of the ground station antenna (hd) is given by:

$$D = \sqrt{2h_a} + \sqrt{2h_g}$$

Since the aircraft altitude is orders of magnitude greater than the ground station elevation, this is often simplified to:

$$D = \sqrt{2h_a}$$

This relationship is illustrated in FIG. 2A. For an aircraft elevation of 10,000 feet, the radio horizon is about 141 miles, and for an aircraft elevation of 30,000 feet, the radio horizon is about 245 miles. While some radio coverage maybe available beyond the radio horizon, this may generally be considered the practical limit of coverage when designing network layouts.

As in terrestrial cellular systems, an idealized ground station layout is a hexagonal grid, as shown in FIG. 2B. If coverage is to be provided for all aircraft above 10,000 feet, the maximum distance from a ground station to the limits of that ground stations coverage is 141 miles, and the geometry of the hexagonal grid dictates that the spacing (S) between adjacent ground station locations be:

$$S = \sqrt{3}D$$

or 244 miles. Commercial aircraft generally are only below an altitude of 10,000 feet while departing from or approaching an airport. For these reasons, 10,000 feet is often selected as a design altitude for complete air-to-ground coverage. It maybe noted that aircraft have coverage at lower altitudes when they are closer to a serving ground station, and for this reason it is reasonable to locate ground stations close to airports in order to provide coverage for approach and departure routes. Where additional air-to-ground communications capacity is required, ground station density may be increased, to reduce the number of aircraft that are served by each ground station.

The use of directional antennas allows ground stations to be "sectored", creating multiple coverage cells per ground station. This is another alternative that increases network capacity, and is often the more economical of the two alternatives. A network layout that provides 3 cells per ground station is shown in FIG. 2C. The numbers of sectors that are optimal for a ground station depend upon the density and geographic distribution of communications requirements in the area of the cell, and the characteristics of the antennas and common air interface technology utilized. While this illustration shows a common sectoring layout for each ground station, the handoff management system accommodates use of varying sector plans per ground station, and also includes the use of adaptable arrays of antennas which provide adjustable and/or steerable antenna patterns.

In the present description, the common air interface technology for a terrestrial air-to-ground system provides one carrier for the forward link between the ground station and the aircraft, and one carrier for the reverse link between the aircraft and the ground station. The same pair of carriers maybe re-used in every cell, thus avoiding the need to develop a frequency re-use plan to achieve acceptable interference levels.

Aircraft Antennas

Figure 3:
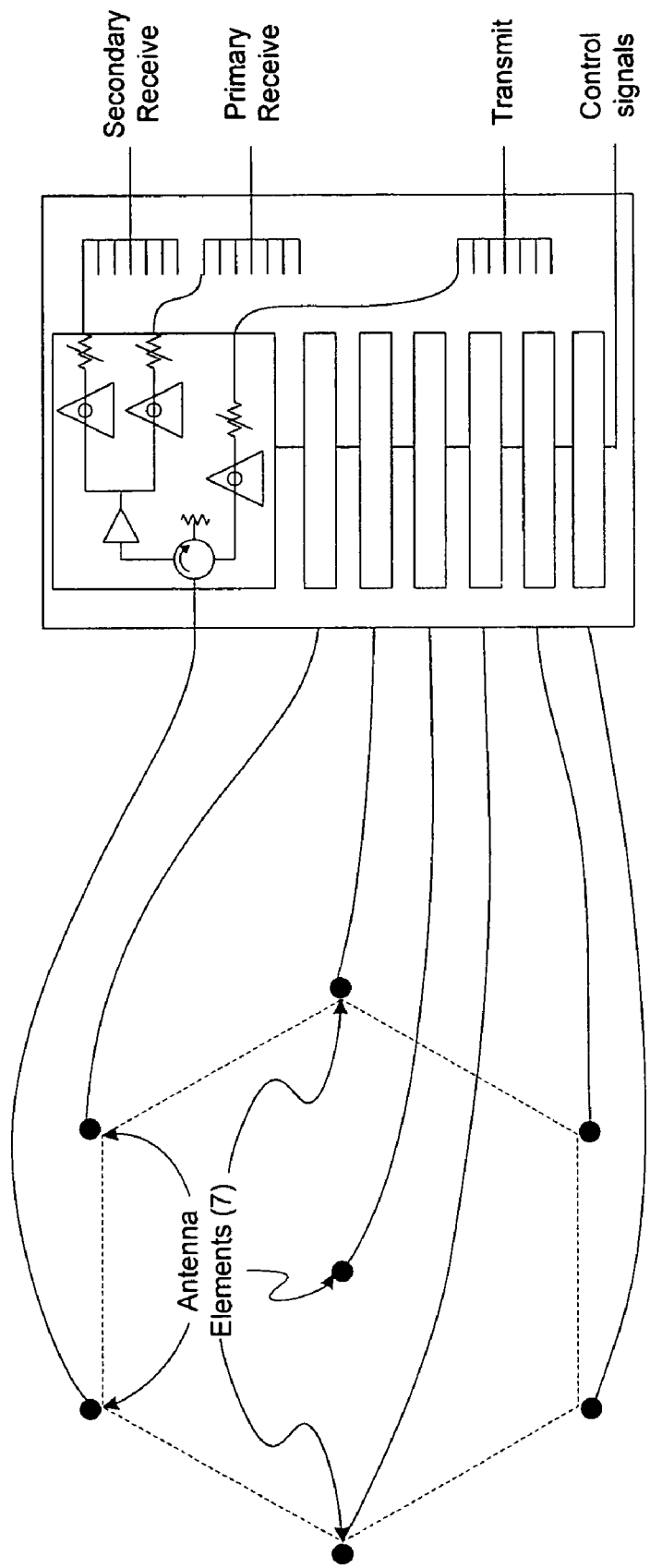
FIG. 3 illustrates one implementation of an array of antennas capable of forming a steerable beam.

However, as noted earlier, many aircraft will be flying at altitudes that have clear paths to multiple ground stations. Communications from the aircraft to a serving ground station therefore also reach other ground stations, where they reduce the capacity and/or performance of those non-serving ground stations. Similarly, communications from non-serving ground stations with clear paths to the aircraft interfere with reception of the signals from the serving ground station. Such impacts can be avoided if aircraft are equipped with steerable antennas that maybe controlled to be oriented towards a particular ground station while having significantly attenuated communications capabilities with other ground stations. Such antennas maybe mechanically steerable, or may be electronically steerable. Electronically steerable antennas consist of an array of simpler antennas, each with an associated phase shifter and attenuator. By controlling the phase and magnitude of the signal from/to each antenna element, the shape and orientation of the antenna pattern can be controlled. FIG. 3 illustrates one implementation of an array of antennas capable of forming a steerable beam. This particular implementation includes a second receiver feed from the antenna, which can be used to create a second steerable beam which can be used by a "search receiver" to detect signals from other ground stations, without impacting the antenna functionally for the primary communications receiver(s). Use of a steerable antenna allows communications to be directional, rather than omni directional, thereby greatly reducing signals between the aircraft and non-serving ground stations. Use of a second receiver with search capabilities allows the transceiver to perform measurements for handoff candidates, providing the equivalent of omni directional search capabilities, while the primary receiver independently maintains communications with the serving ground station.

Figure 4:
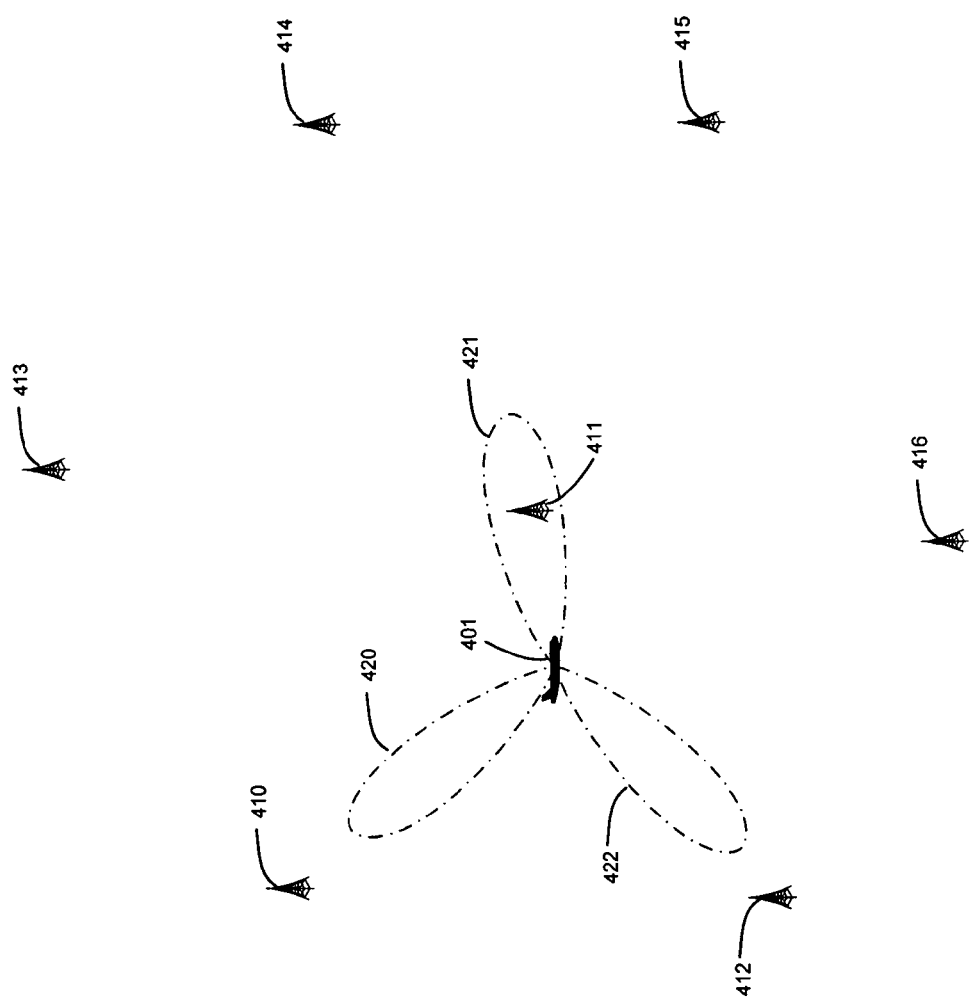
FIG. 4 illustrates an aircraft with three separate steerable beams, communicating with three ground stations.

Aircraft are equipped with steerable antennas, which maybe controlled to be oriented towards a particular ground station. Multiple steerable antennas maybe used to allow simultaneous communications with multiple ground stations. Each steerable antenna and associated transceivers can independently establish communications with a corresponding ground station, and FIG. 4 illustrates an aircraft with three separate steerable beams, communicating with three ground stations. Aircraft 401 communicates with ground station 410 via antenna beam 420, with ground station 411 via antenna beam 422, and with ground station 412 via antenna beam 423. Alternatively, a single antenna maybe equipped with an electronic beam forming system that allows the independent control of multiple beams for communications with said ground stations. The antenna is capable of forming three separate beams to allow communications between three different ground stations and corresponding terrestrial air-to-ground transceivers aboard the aircraft. The control of the antenna beam's orientation maybe controlled by the transceivers, so that as the aircraft moves relative to the ground stations the antenna beams maybe maintained so that they are targeted at the desired ground stations. An enhancement would also allow the transceivers to create a null in the direction of one or more ground stations that are a source of potentially interfering signals, in order to improve the performance of the desired signal link. Alternatively, the orientation of antennas and/or nulls are controlled by a separate controller, which utilizes location measurements of the aircraft and known locations of the ground stations to periodically calculate the desired orientations.

Satellite Air-to-Ground Cellular Networks

Figure 6:
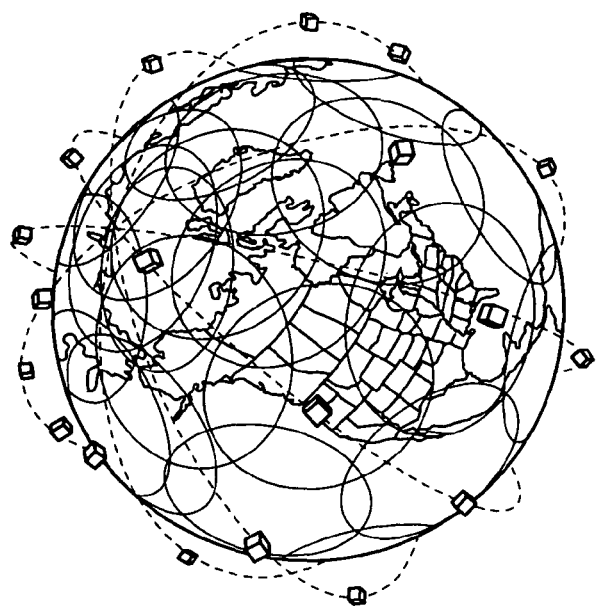
FIGS. 5 and 6 illustrate examples of the coverage and satellite constellations for certain satellite systems.
Figure 5:
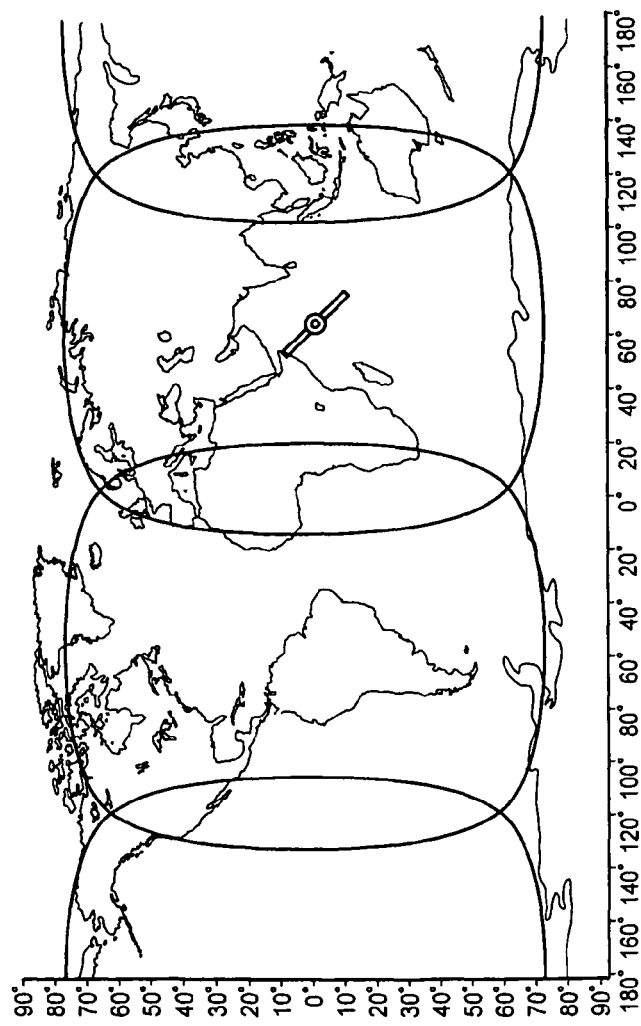

There are a variety of satellite networks which are capable of providing satellite air-to-ground communications services. A satellite in Geosynchronous Earth Orbit (GEO satellite) is able to cover a large portion of the earth's service as shown in FIG. 5. Four satellites are able to cover the Earth's entire surface, except for the extreme polar regions, with each satellite located in a constant position over the Earth's equator. Low Earth Orbit (LEO) satellite systems as shown in FIG. 6 utilize a constellation of satellites operating in low orbit to provide global coverage. Various other satellite systems could be used to offer a broad range of communications capabilities.

The present handoff management system contemplates the installation of one or more satellite air-to-ground communication systems on an aircraft. Satellite air-to-ground communication systems which offer relatively low capacity often use fixed antenna system mounted on top of the aircraft, while those with greater capacity use some form of steerable antenna mounted on the upper surfaces of aircraft. These antennas maybe electrically steerable arrays, mechanically steered antennas, or antennas which use a combination of technologies. The satellite tracking capabilities are generally built into the satellite air-to-ground equipment for the aircraft, and for the purposes of this description, each satellite system equipped may be considered as a radio transceiver system with an available capacity (which capacity may vary from time to time depending upon a variety of factors including the geographic location of the aircraft).

Terrestrial Mobile Networks

There are a number of types of terrestrial cellular networks that could be used to provide communication services to an aircraft on the ground, thus allowing air-to-ground communication services (terrestrial or satellite) to be dedicated to serving airborne aircraft. The most obvious alternatives include "conventional" cellular or PCS systems. However, a wide variety of technologies and frequency bands could be appropriate; the basic requirements are that the service can be made available in a substantial portion of airports to be served, and that the service be able to provide adequate bandwidth in an airport-operating environment.

Typical Aircraft Air-To-Ground Communication System

Figure 7:
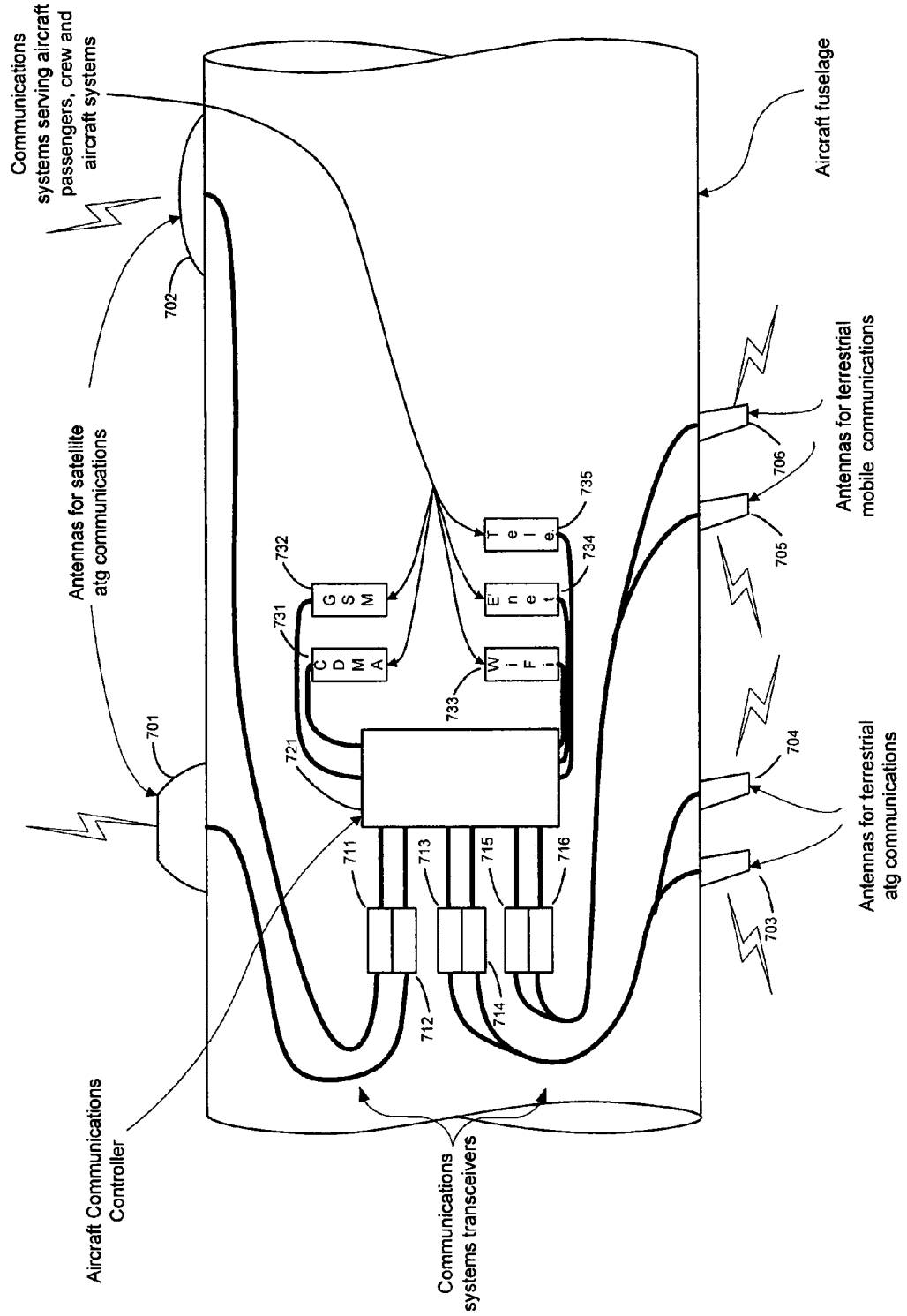
FIG. 7 illustrates, in block diagram form, the architecture of a typical aircraft air-to-ground communication system.

FIG. 7 illustrates, in block diagram form, the architecture of a typical aircraft air-to-ground communication system. The Inner Network may include multiple transport networks—one or more terrestrial air-to-ground cellular networks 101, one or more satellite air-to-ground cellular networks 102 and one or more terrestrial networks 103. Each network may require separate antennas and/or transceivers aboard the aircraft. Satellite air-to-ground antennas 701 and 702, connected to satellite transceivers 711 and 712 may support two different satellite air-to-ground cellular networks. Terrestrial air-to-ground antennas 703 and 704, connected to transceivers 713 and 714 may support two independent terrestrial air-to-ground cellular networks. Terrestrial mobile system antennas 705 and 706 interconnected to transceivers 705 and 716 to provide access to multiple terrestrial cellular networks. It is possible that networks may share some elements—for instance, a single antenna system and/or transceiver system might serve all terrestrial air-to-ground and terrestrial cellular networks.

All transceiver elements interface to the Aircraft Communications Controller 721. The Aircraft Communications Controller 721 in turn interfaces to the various Outer Network elements providing services to the passengers, crew and aircraft systems. These elements could include, without limitation, one or more CDMA base stations 731, one or more GSM base stations, one or more Wi-Fi wireless access points 733, Ethernet Network Interfaces 734 and/or one or more aircraft system sensors 735. The Aircraft Communications Controller 721 provides local control of the operation of all such elements, activating and de-activating them in accordance with administrative commands received over air-to-ground links, or in accordance with locally generated requirements. As part of the overall control capability, the Aircraft Communications Controller 721 controls the level of access to any particular service by exerting control over the capacity available for such service. For instance, a GSM base station with an inherent capacity to handle 7 simultaneous voice calls might have three active calls, and might be instructed by the Aircraft Communications Controller 721 to generate an "all channel busy" indication if a fourth access attempt is made.

Figure 8:
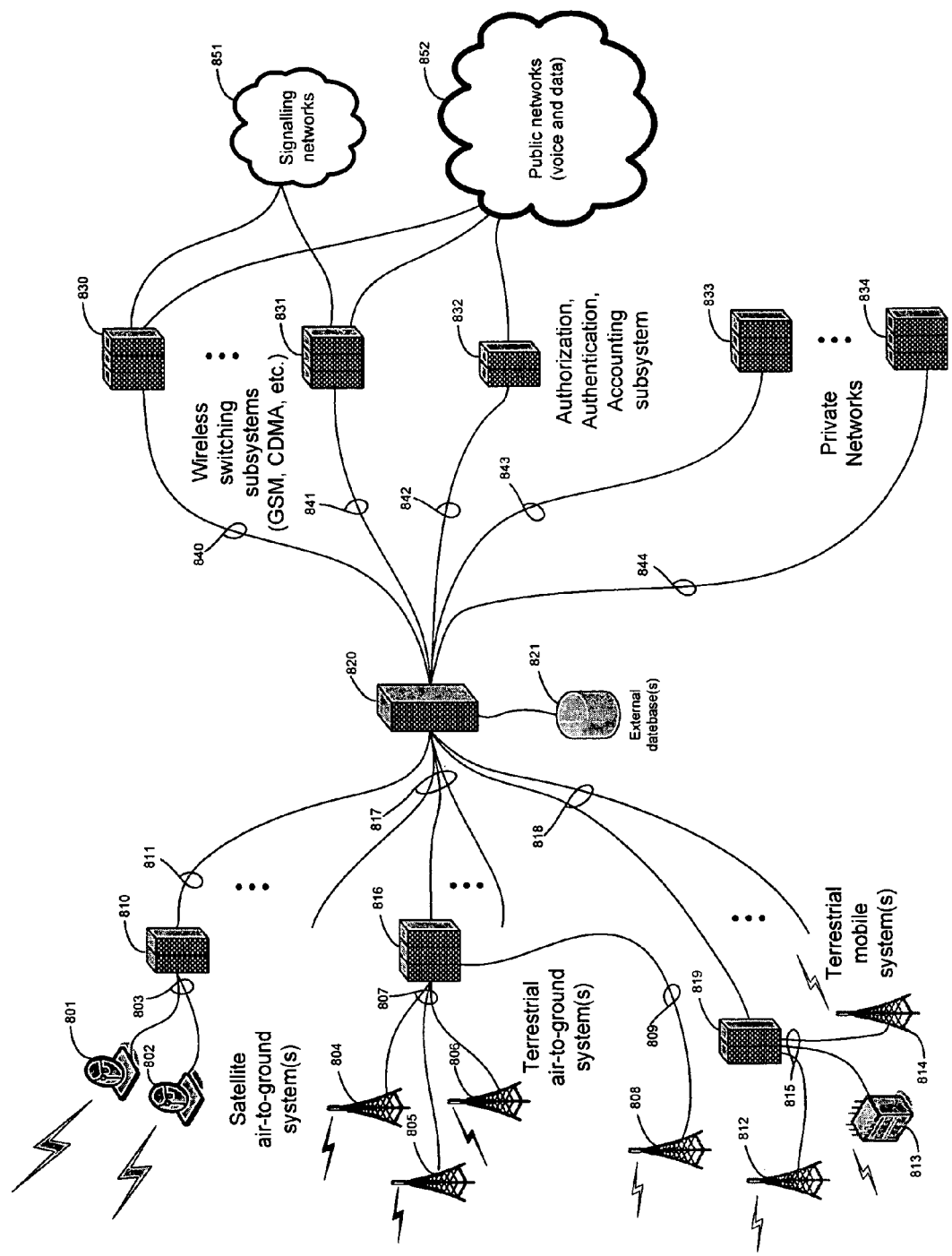
FIG. 8 illustrates, in block diagram form, the architecture of the terrestrial elements of a multi-network air-to-ground communications network.

FIG. 8 illustrates, in block diagram form, the architecture of the terrestrial elements of a multi-network air-to-ground communications network. One or more satellite air-to-ground cellular networks maybe utilized, each including satellites (not shown), one or more earth stations 801, 802 and network control and management center 810, are connected via communications links 811 to the Ground Communications Controller 820. One or more terrestrial air-to-ground cellular networks, each consisting of a number of ground stations 804-806, communications facilities 807 connecting to one ore more ground station control elements 816. The ground station control elements 816 are connected to the Ground Communications Controller 820 via communications facility 817.

In situations where the terrestrial air-to-ground systems are compatible with terrestrial cellular technologies, it is possible to also connect terrestrial base stations 808 to the ground station controller 816 utilized by the terrestrial air-to-ground cellular network ground stations 804-806, using a communications facility 809. In such cases, the ground station controller 816 is comparable in capabilities to a terrestrial cellular base station controller due to the common technologies used.

Terrestrial mobile networks, each consisting of a multiple base station 812-814 connected to base station controllers 819 via communications facilities 815 maybe utilized to provide coverage for aircraft on the ground at selected airports. In general, each airport would be served by a separate terrestrial network, and would be connected via a communications facility 818 to the Ground Communications Controller 820.

The Ground Communications Controller 820 is a central aggregation/disaggregation point for all communications between the Outer Network elements aboard the aircraft and terrestrial Outer Network elements. Communications between each airborne Inner Network element and the appropriate switching subsystem are provided, thereby providing a full range of services to passengers, crew and aircraft systems. That is, communications of the one or more CDMA base stations aboard any aircraft are connected to the CDMA switching subsystem 830, via communications links 840 allowing voice and data communications and network signaling to be connected to external networks 851, 852 as required. Similarly, communications of GSM, Wi-Fi and private or proprietary systems are connected with the appropriate common switching subsystems 831-834, allowing connections to external networks 851, 852 as required. In this context, the term "switching subsystem" is considered to include any billing, administration, vertical services or similar capabilities that are typically associated with providing services with each different type of network.

Signal Flow in the Handoff Management System

Figure 9:
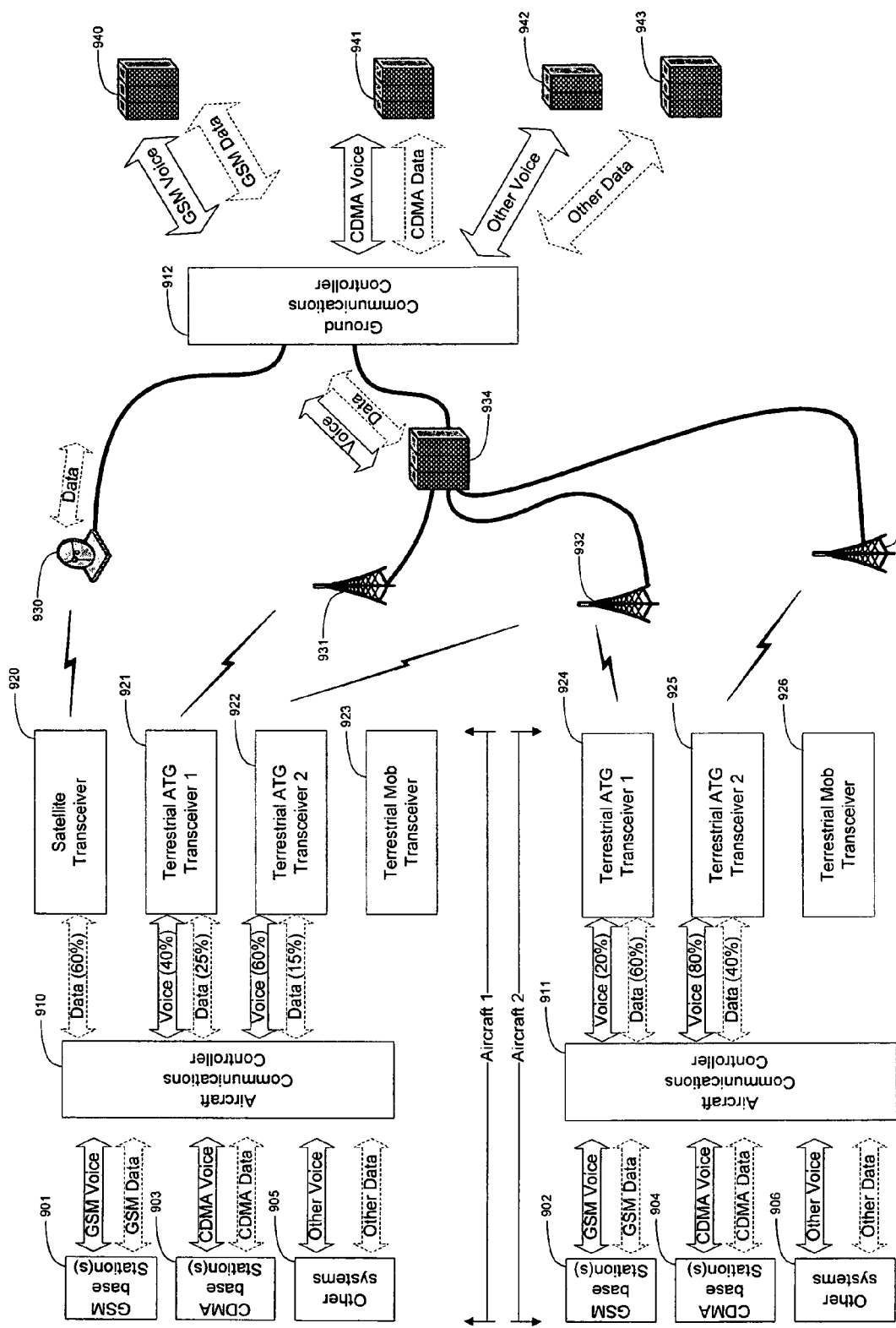
FIG. 9 illustrates the flow of call traffic communications in the subject handoff management system.
Figure 10:
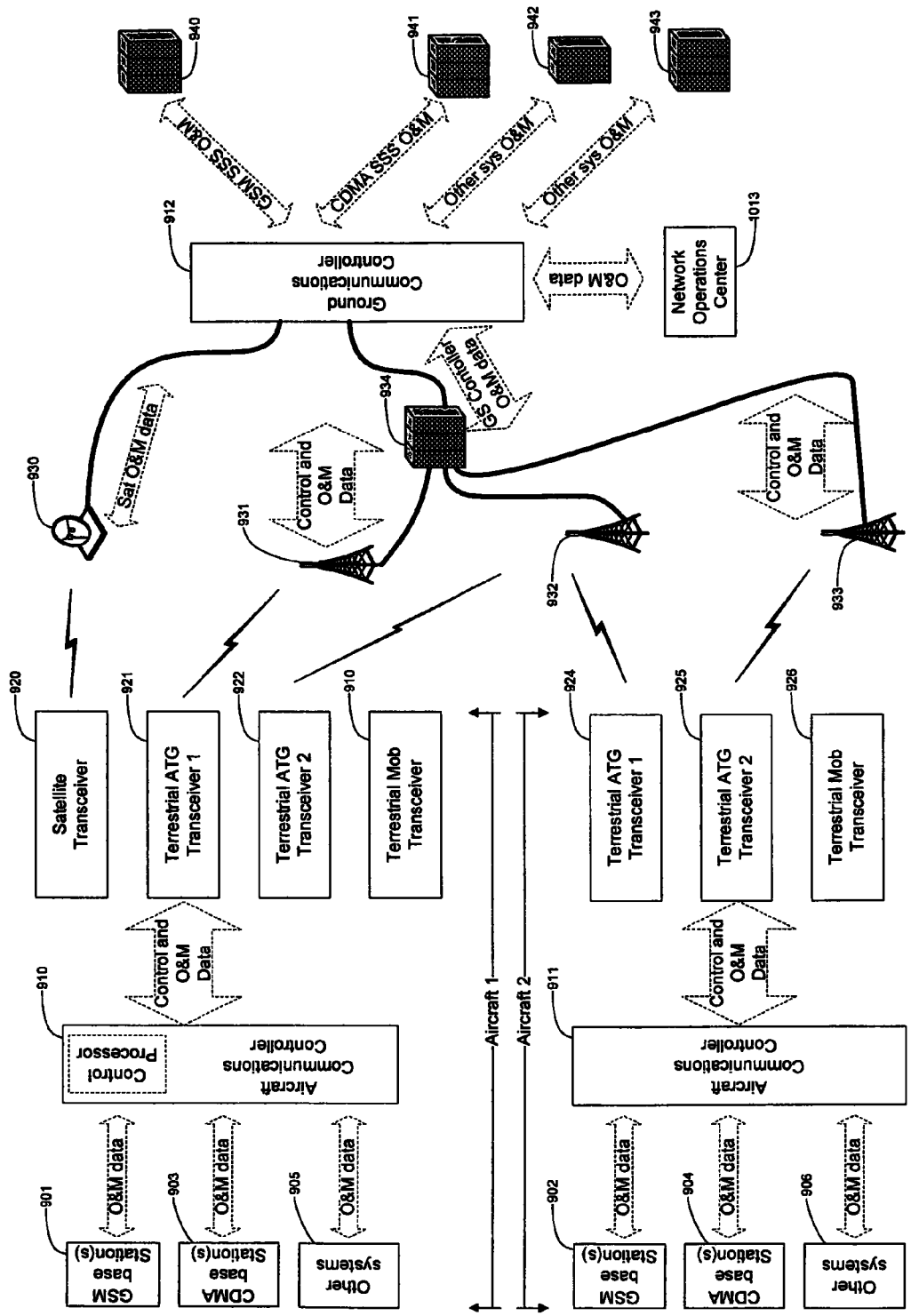
FIG. 10 illustrates the flow of various control signals in the subject handoff management system.

FIG. 9 illustrates the flow of call traffic communications in the subject handoff management system and FIG. 10 illustrates the flow of various control signals in the subject handoff management system. In this example the two aircraft (Aircraft 1, Aircraft 2) each have both GSM base stations 901, 902 and CDMA base stations 903, 904 equipped, as well as other voice and data service capabilities 905, 906. The signals from these devices connect with the Aircraft Communications Controllers 910, 911, which route these communications in accordance with instructions received from the Ground Communications Controller 912. The first aircraft (Aircraft 1), equipped with satellite air-to-ground capabilities, is shown at an instant in time when 60% of the data traffic is routed via the satellite air-to-ground transceiver 920, with 25% of the data routed via the first terrestrial air-to-ground transceiver 921 and the remaining 15% routed via the second terrestrial air-to-ground receiver 922. Voice communications are routed via the two terrestrial air-to-ground transceivers 921, 922, 40% on the first and 60% on the second. In this instance, the aircraft doesn't have a terrestrial network available, and no communications are routed via the terrestrial cellular receiver 923. The second aircraft (Aircraft 2) does not have satellite air-to-ground cellular network capabilities and the communications are routed over two terrestrial transceivers 924, 925. Aircraft 2 is shown at an instant in time when 60% of the data traffic is routed via the first terrestrial air-to-ground transceiver 924 and 40% of the data is routed via the second terrestrial air-to-ground receiver 925. Voice communications are routed via the two terrestrial air-to-ground transceivers 924, 925, 20% on the first and 80% on the second. The distribution of communications could be different in the forward (ground to aircraft) and reverse (aircraft to ground) directions, due to the typical asymmetry of data communications.

All communications from all aircraft transceivers are routed through their corresponding ground-based transceiver element—earth station 930 for the satellite air-to-ground cellular network 102 and ground-based base stations 931, 932, 933 for the terrestrial air-to-ground cellular network 101. Ground-based base stations 931-933 are connected to a ground station control systems 934, which, along with the earth stations 930 (and corresponding base station control systems for terrestrial cellular networks), are in turn connected to the Ground Communications Controller 912.

Communications protocols utilized between the Aircraft Communications Controllers 910, 911 and the Ground Communications Controller 912 provide identification of the source and destination for all communications. The header information in one or more of the protocols within the Internet Protocol suite can be used to provide this capability. These protocols are used to assure that communications between the airborne Outer Network elements are routed to the appropriate terrestrial Outer Network elements. In this manner, communications of the GSM base station aboard an aircraft maybe routed to/from the GSM switching subsystem 940, CDMA base station communications are routed to/from the CDMA switching subsystem 941, and other voice and data signals routed to/from their respective switching subsystems 942, 943.

Embedded in the communications between the various Outer Network elements are substantial administrative and signaling data that are defined within the standards for the technologies (GSM, CDMA, etc.) that are provisioned. In utilizing equipment designed and constructed to those standards, additional ancillary controls maybe required for operations and/or maintenance of the equipment. Similarly, Inner Network Elements such as the transceivers may require ancillary controls that are not readily available within the technical standards of the equipment adopted for use for air-to-ground links. As illustrated in FIG. 10, such ancillary operations and maintenance (O&M) controls maybe terminated on an Aircraft Communications Controller 910, 911 (for airborne elements) and the Ground Communications Controller 912, where they are incorporated into the overall communications requirements of the system. This allows all network elements to be controlled and monitored via a Network Operations Center 913 that is connected to the Ground Communications Controller 912. In addition, it allows the Control System, (Ground Communications Controller 912 and Aircraft Communications Controllers 910, 911) to directly control various aspects of the operation of network elements. Thus, a base station 901-904 or other Outer Network equipment 905, 906 on board an aircraft could be controlled and or monitored in some aspects of its operation by the its switching subsystem, and be controlled or monitored in some aspects of its operation by the Aircraft Communications Controller 910, 911, and be controlled or monitored in some aspects of its operations by the Ground Communications Controller 912, and also be controlled or monitored in some aspects of its operations by the Network Operations Center 913.

Dynamic control of the Ground Station Control System 934, by means of another O&M link allows the Ground Communications Controller 912 to dynamically configure the communications channels between ground stations and terrestrial air to ground transceivers in order to allocate ground station capacity to various aircraft as required. Communications between the various Aircraft Communications Controllers 910, 911 and the Ground Communications Controllers 912, in the form of Control Data, allow the exchange of status information, databases and commands required to provide overall Control System capabilities. The Ground Communications Controller 912 can dynamically change the load among the transceivers on an aircraft, with the load carried by terrestrial air-to-ground transceiver 921 in Aircraft 1 being completely different than load carried by terrestrial air-to-ground transceiver 922 in Aircraft 1.

The load distribution can be by type of traffic: voice, data, multi-media and the Ground Communications Controller 912 manages the multidimensional communication space, considering the many factors noted above. Similarly, the traffic load emanating from an aircraft can be dynamically allocated among the various air-to-ground cellular networks: terrestrial air-to-ground cellular network 101, satellite air-to-ground cellular network 102, and terrestrial cellular network 103. The Ground Communications Controller 912 typically communicates with multiple aircraft, and thus, multiple Aircraft Communications Controllers 910, 911 as shown in FIG. 9, and can therefore manage the multi-dimensional communication space to coordinate the flow of traffic generated by the various aircraft—disseminated into the volume of space managed by the Ground Communications Controller 912.

Aircraft Activation of Handoff Management System

Figure 11:
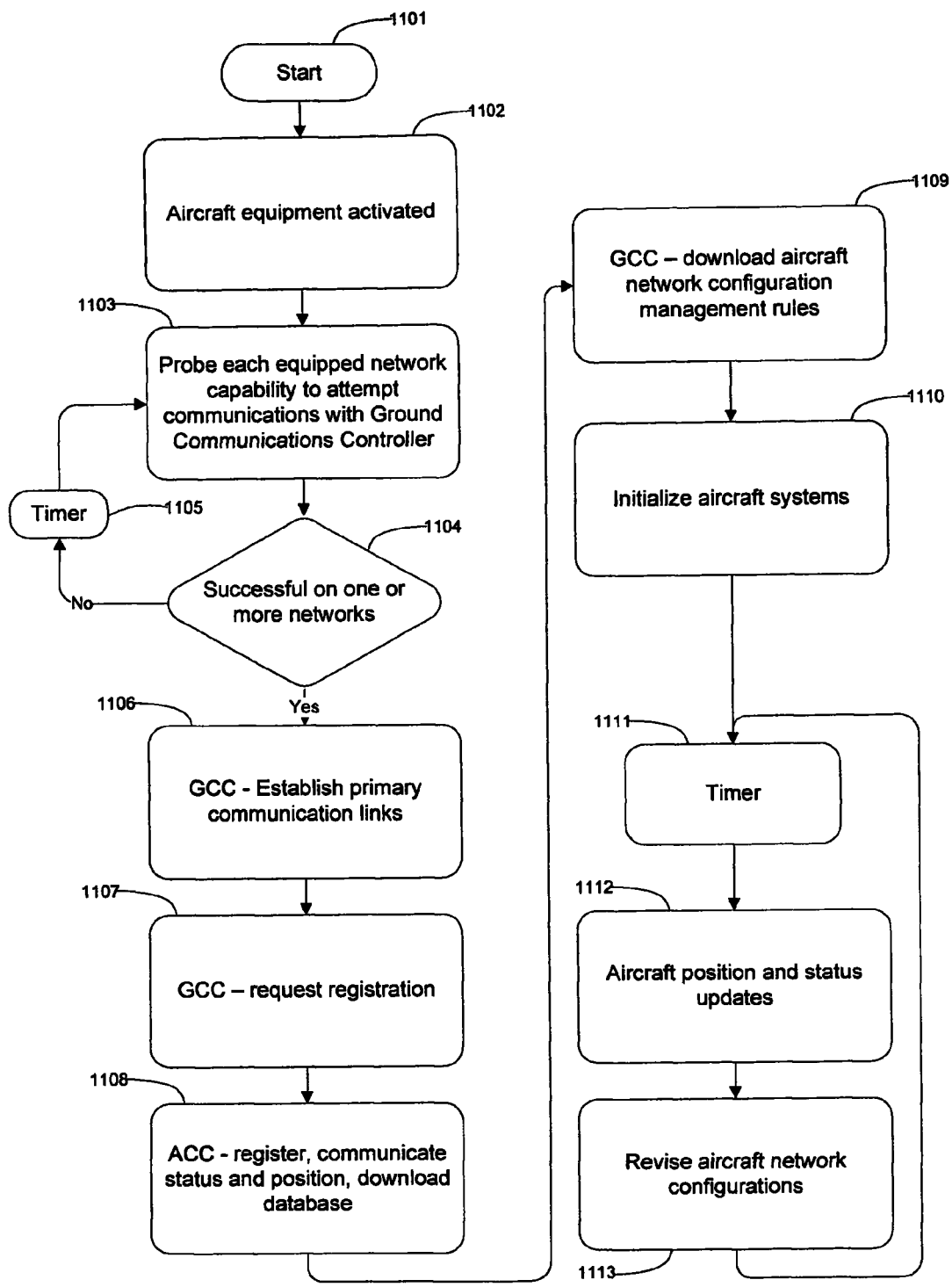
FIG. 11 illustrates in flow diagram form, the communications management process used by the handoff management system when an aircraft system is activated.

FIG. 11 illustrates in flow diagram form, the communications management process used by the handoff management system when an aircraft system, such as Aircraft 1 in FIGS. 9 & 10, is activated. All aircraft systems are generally deactivated when the aircraft is out of service, therefore when the aircraft is returned to service at step 1101, and the communications subsystems are activated at step 1102, the Aircraft Communications Controllers 910 need to establish communications with the Ground Communications Controller 912. The Aircraft Communications Controller 910, 911 at step 1103 attempts to communicate with the Ground Communications Controller 912 via each of the equipped network capabilities. If the system is not successful in establishing communications via any of the network as determined at step 1104, it retries to establish communication based upon the setting of an internal timer at step 1105 until it is successful. When it has established contact with the Ground Communications Controller 912, the Ground Communications Controller 912 at step 1106 selects one of the available networks as the primary communication link for immediate administrative purposes, and instructs the Aircraft Communications Controller 910 to register at step 1107. The Aircraft Communications Controller 910 then registers, provides the status of all aircraft subsystems, and provides current location and velocity information at step 1108.

The operational configuration of the various networks of the Outer Network that are providing services onboard the aircraft maybe required to be restricted, depending upon the status of the aircraft. As an example, services to wireless devices maybe required to be restricted below certain altitudes, in order to avoid interference impacts to terrestrial systems. Or the radio frequency channels that maybe utilized by the in-cabin base stations maybe dependent upon the location of the aircraft. Alternatively, the available capacity on the air-to-ground transport networks may require that the capacity of certain services be modified to avoid degradation of service. The operational configuration each of the aircraft services networks is controlled by the control capabilities of the Ground Communications Controller 912 and the Aircraft Communications Controller 910. The Ground Communications Controller 912 at step 1109 downloads data representing the control requirements for the operational configurations, other than those that are derived from transport network constraints. The Aircraft Communications Controller 910, based upon those control requirements and current aircraft status and position updates, controls the aircraft network configurations at step 1110. The Ground Communications Controller 912, in response to the cycling of an update timer 111, periodically updates of the position and status of the aircraft at step 1112, generates configuration updates 1113, transmits them to the Aircraft Communications Controller 910 and the Aircraft Communications Controller 910 then applies them to the aircraft networks.

Handoff Management

Once the aircraft system has been activated and initialized, the control systems smoothly integrate the capabilities of the various available networks. The Aircraft Communications Controller 910 provides control of the communications capabilities onboard the aircraft. The Aircraft Communications Controller 910 also collects the status of all on-board air-to-ground systems and the location and velocity of the aircraft, and communicates such data to the Ground Communications Controller 912. The Ground Communications Controller 912 collects and processes the information from all active Aircraft Communications Controllers 910, analyzes such information in conjunction with additional data that is available to it, calculates the desired Inner Network configuration, calculates any additional restrictions required on aircraft configurations, identifies changes to Inner Network configuration, and implements those changes in conjunction with the Aircraft Communications Controller 910.

Figure 12:
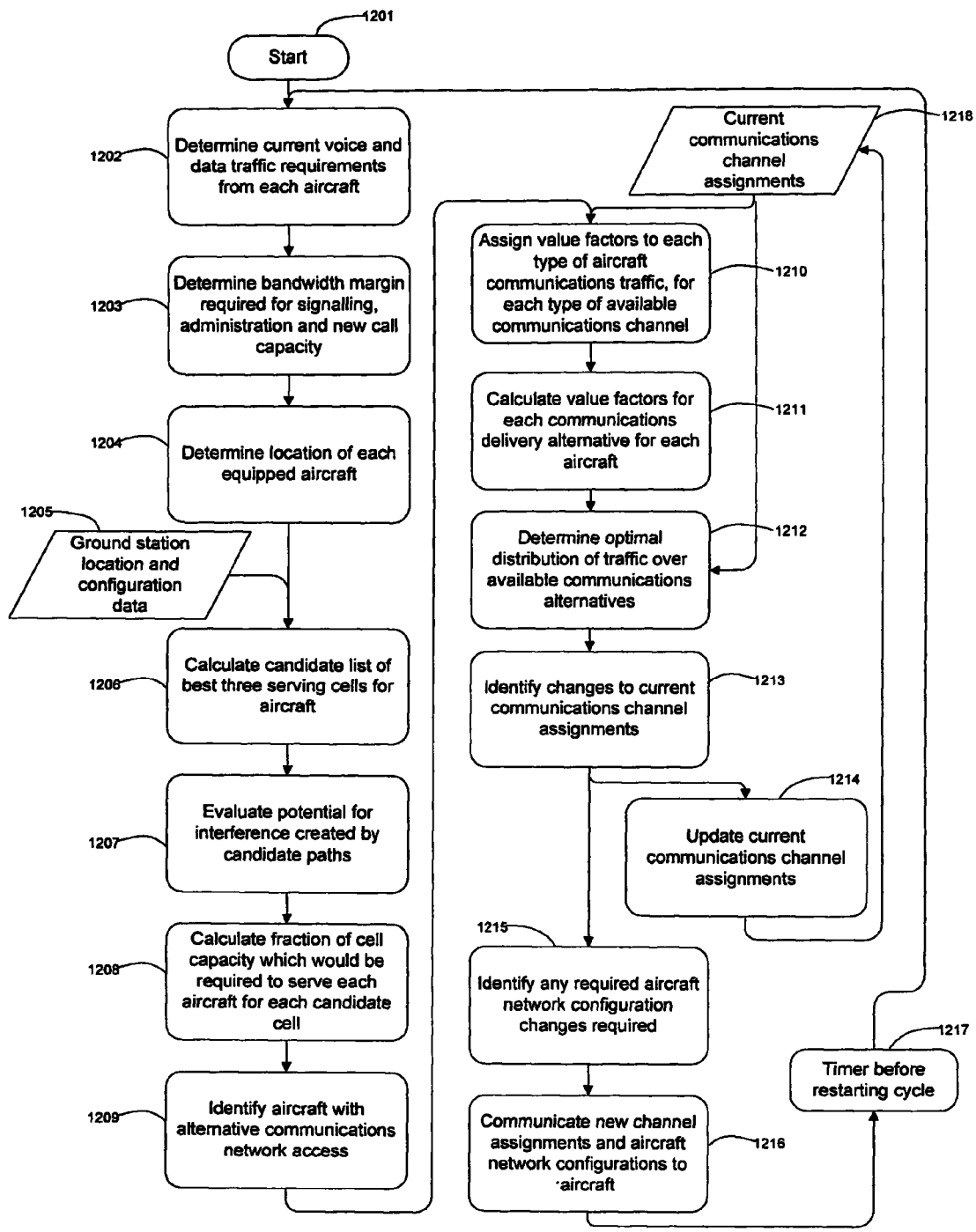
FIG. 12 illustrates, in flow diagram form, the process used by the handoff management system for assigning communications capabilities to each served aircraft.

FIG. 12 illustrates, in flow diagram form, the process used by the handoff management system for assigning communications capabilities to each served aircraft. The current voice and data communications requirements of each aircraft are determined at step 1202 and communicated from each Aircraft Communications Controller 910 to the Ground Communications Controller 912, which determines the overall bandwidth required to serve the aircraft by assessing the additional bandwidth required to support signaling and administration, and by adding a margin to support new call originations at step 1203. These factors maybe determined by special-purpose algorithms, or by database lookups. The location of each aircraft is determined at step 1204 either from an onboard system, with data communicated via the Aircraft Communications Controller 910, or by accessing external databases at step 1205 which may make such information readily available to the Ground Communications Controller. Table 1 below illustrates this, where $D_{ki}$ denotes the demand for service k to aircraft i.

TABLE 1

Demand by aircraft

| Demand Service type | Aircraft 1 | ... | Aircraft i | ... | Aircraft n |
|---|---|---|---|---|---|
| 1-Cont Data | $D_{11}$ | | $D_{1i}$ | | $D_{1n}$ |
| 2-Voice 1 | $D_{21}$ | | $D_{2i}$ | | $D_{2n}$ |
| 3-Voice 2 | $D_{31}$ | | $D_{3i}$ | | $D_{3n}$ |
| 4-Data 1 | $D_{41}$ | | $D_{4i}$ | | $D_{4n}$ |
| 5-Data 2 | $D_{51}$ | | $D_{5i}$ | | $D_{5n}$ |

Control Data (Cont Data in table) represents the data communications between the Aircraft Communications Controller 910 and the Ground Communications Controller 912 and, under most circumstances, would represent data with the highest priority. Voice 1 and Voice 2, and Data 1 and Data 2 represent data with different delivery priorities. In concept, the number of service types can be expanded to whatever degree is necessary to differentiate between different service requirements.

Figure 13:
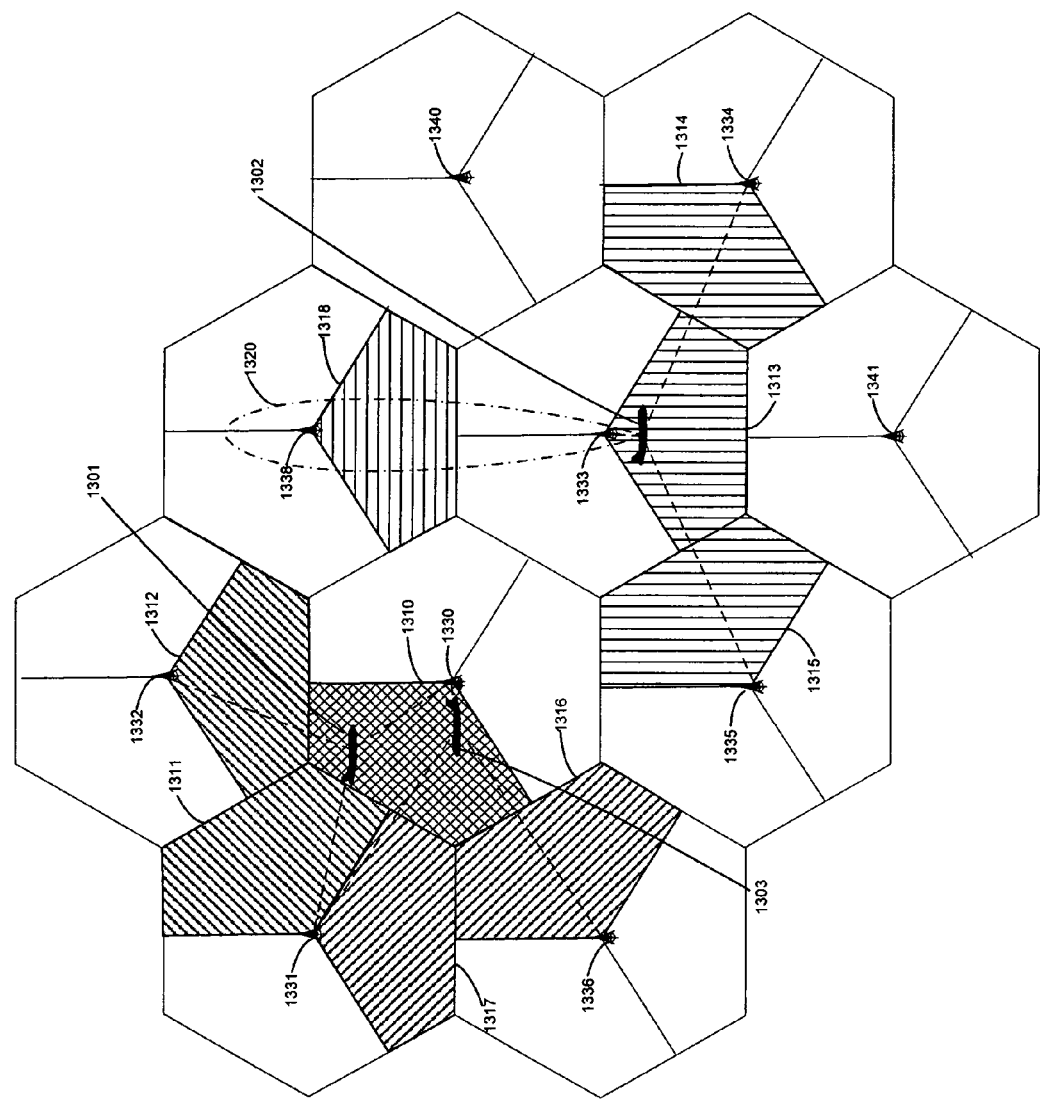
FIG. 13 illustrates an example of the relationship between aircraft and candidate serving cells for a terrestrial air-to-ground cellular network.

The Ground Communications Controller 912 has available a database containing the locations of all terrestrial air-to-ground ground stations, as well as their configurations and operational status. Computational algorithms resident in the Ground Communications Controller 912 calculate, based upon the aircraft location and the configuration of aircraft and ground station transceivers and antennas, the service levels that proximate air-to-ground cells are able to provide to the aircraft at step 1206. FIG. 13 illustrates an example of the relationship between aircraft and candidate serving cells for a terrestrial air-to-ground cellular network. Aircraft 1301 is best served by cell 1310, and can also be served by cells 1311 and 1312. Aircraft 1302 is best served by cell 1313, and can also be served by cells 1314 and 1315. Aircraft 1303 is also best served by cell 1310, and also maybe served by cells 1316 and 1317.

The Ground Communications Controller 912 at step 1207 calculates the signal levels on antennas systems oriented towards each of the three candidate serving cells, by considering the transmitted power of the ground station, the antenna pattern of the ground station antenna, the free space path loss between the aircraft and the ground station and the antenna pattern of the aircraft antenna. (This process may be extended to terrestrial mobile base stations if the aircraft is within the permissible range of such services.) Alternatively, if aircraft are equipped with search receivers as previously described, signal strengths maybe determined more directly. CDMA 1x-RTT provides a technique whereby each mobile unit periodically checks the signal levels available from each site on a "neighbor list" of nearby cells. This mechanism can be readily adopted by downloading neighbor lists and uploading measurement reports from the airborne transceivers. However, since conventional CDMA 1x-RTT systems are based upon the use of non-beam-forming antennas, modifications must be made to assure that the measurements for each neighbor correspond to the signal received when the neighbor is within the main beam of the aircraft antenna. In this manner, measurement reports received reflect the transmitted power of the ground station, the antenna pattern of the ground station antenna, and the free space path loss between the aircraft and the ground station, and only require that the measured value be adjusted to reflect the antenna discrimination towards the transmitting cell when the aircraft antenna is oriented towards each of the candidate serving cells.

Once the receive signal levels from all cells are determined for each of the antenna orientations which correspond to the orientations for each of the candidate serving cells, the Signal to Interference and Noise Ratio (SINR) maybe calculated for each candidate cell. The Signal to Interference and Noise Ratio level, for an EV-DO implementation, determines the forward link data rate which maybe obtained from the associated cell. Each of the current voice and data requirements from aircraft may then be expressed as a portion of the available forward link capacity from each candidate serving cell at step 1208. Each of the voice and data requirements may also be expressed as a percentage of the available satellite capacity at step 1209 (or, in the case of multiple satellite system availability, as a percentage of each available satellite system capacity.) For a single aircraft i considering a single candidate server j, we would have:

$$R_{ij} \propto SINR_{ij}$$

where $R_{ij}$ is the data rate that can be obtained for $SINR_{ij}$. The value of $R_{ij}$ can be determined from a lookup table that reflects the characteristics of system in use.

Each type of network service has a value assigned for each type of service, reflecting the relative service revenues, network costs and technical preferences for service delivery as determined at step 1210. An example of such a value system is shown in Table 2 below.

TABLE 2

Relative values of communications delivered via alternative networks

| Value Service type | Sat Mob | Terr. ATG | Terr. Mob |
|---|---|---|---|
| 1-Cont Data | 83 | 97 | 100 |
| 2-Voice 1 | 63 | 77 | 80 |
| 3-Voice 2 | 43 | 57 | 60 |
| 4-Data 1 | 13 | 25 | 28 |
| 5-Data 2 | 2 | 9 | 12 |

In this case, the relative values reflects that Control Data is the most important service, that voice services are most suitably delivered via terrestrial services, and have higher value than data services. The relative values also reflect a lower service cost for mobile services than air-to-ground services. This concept maybe expanded to an unlimited number of service types, and can also be extended to networks and/or sub-networks to provide any desired level of granularity. These relative values can then be applied at step 1211 to each of the candidate serving links for the aircraft, that there is a value $V_{kij}$ which represents the per unit value of service k delivered to aircraft i via link j.

As further shown in the flow chart of FIG. 12, the Ground Communications Controller 912 utilizes an optimization routine to develop a satisfactory Inner Network communication distribution over the communications alternatives available to each aircraft. A fraction of the available capacity of each server ranging from 0 to 1 is allocated at step 1212 to the various service types on each aircraft, such that demand is satisfied without exceeding the available capacity. That is:

$$D_{ki} = \sum_{j=1}^{n} R_{ij} \times f_{kij}$$

where $f_{kij}$ is the fraction of the capacity of the $j^{th}$ cell allocated to proving service k on aircraft i.

Determining the absolutely optimal configuration of assignments could be performed by assessing every possible combination of alternative connections between aircraft and serving transport networks and selecting the combination that had the maximum overall value. However, the computational complexity of such an approach becomes impractical as the number or aircraft, ground stations, cell sites and satellite systems in a typical implementation are considered. Various optimization methodologies and algorithms are readily available to those skilled in the art to allow sufficiently useful results to be achieved with a reasonable level of computational complexity.

A linear programing technique maybe used to visualize on means to accomplish such an optimization. Linear programming is a technique which seeks to optimize (maximize or minimize) an objective, subject to a set of constraints. In this case the objective function which is to be optimized would represents the aggregate value of all service types for all aircraft, based upon the communications links used, or:

$$z = \sum_{i=1}^{n} \sum_{i=1}^{m} \sum_{k=1}^{5} R_{ij} \times f_{kij} \times V_{ijk}$$

This objective must be optimized in accordance with the constraints on the total capacity of each cell:

$$\sum_{i=1}^{n} \sum_{k=i}^{5} f_{kij} \leq 1$$

This assures that the fractions of capacity assigned to various aircraft and services do not exceed the total capacity available. And the constraint $$f_{kij} \geq 0 \ \forall k,i,j$$

assures that all values of the variable $f_{kij}$ are achievable values.

This rather straight forward (although potentially large) linear programming problem can be readily solved using the Simplex Method. Many alternative optimization approaches maybe used, including those which support integer solutions or non-linear relationships, and which may support faster analysis, and/or more efficient solutions.

The analysis presented above represents only the forward link communications requirements. A very similar analysis is required for the reverse link. A reasonable first approximation is that aircraft, due to the directional antenna, are capable of communicating with a particular cell without causing interference with adjoining cells, that the reverse link is not limited by maximum mobile transmit power capabilities, and that the fraction of reverse link capacity used is directly proportional to the communications bandwidth supplied. The nominal cell capacity maybe considered to be the capacity corresponding to a 6 dB rise above thermal noise, thereby leaving some margin for modeling inaccuracies.

The assignments resulting from the optimization process are compared to the existing assignments and the changes in channel assignments are identified at step 1213. As the distribution of aircraft changes, it may be possible that the overall Inner Network capacity available to some aircraft will not be adequate to provide the bandwidth targeted in the second step of this process. While customer data transactions are somewhat "elastic", and able to continue at a lower rate, customer voice traffic is relatively "inelastic". In order to best manage such situations, it is useful to control the in-cabin systems in order to minimize customer-affecting issues. The Ground Communications Controller 912 compares the bandwidth available to the aircraft and the current configuration of the in-cabin systems, and determines changes that should be executed by the Aircraft Communications Controller 910 at step 1214 and identifying aircraft network configurations at step 1215. As examples, the Aircraft Communications Controller 910 may be instructed to reduce the available capacity of one or more base stations, in order to prevent additional call originations or to throttle demand, or the vocoder rates may be reduced, to reduce the bandwidth required to support each active call. In the event that all such options to reduce bandwidth requirements are not sufficient to allow all calls to be maintained, the cabin systems may be directed to selectively "drop" calls, with those having the lowest grade of service objective being dropped first. Such instructions to reduce capacity requirements would be later revised when additional capacity becomes available.

Upon completion of the network analysis and bandwidth analysis, all change requirements are communicated to the Aircraft Communications Controller 910 at step 1216, and stored in memory at step 1218 to initiate the required changes to Inner and Outer Network configurations. This entire optimization process is periodically repeated, as driven by the operation of timer at step 1217, which reinitiates process step 1202 upon expiration of the timer cycle.

A further enhancement to the optimization process is to utilize each aircraft's velocity information (i.e. the aircraft's heading, speed and rate of change in altitude) to predict the change of position expected in the position of the aircraft, over some number of timer intervals. This predictive information can be used to further refine the network assignment process, allowing channels to be selected which be utilized for a greater duration than might be the case with an optimization process that considers the aircraft in only a static position. In the preferred embodiment, each candidate path is evaluated to determine its state in the future, and the optimization cost factors for paths that are not a best server at the end of the predictive timeframe is increase in a manner that makes their assignment less likely than alternative paths that remain for the duration of the timeframe. While the scale of coverage differs significantly for satellite systems, terrestrial air-to-ground systems and terrestrial cellular systems, the methodology for predicting future aircraft position and analyzing the RF paths that be available from that position are similar for all of them.

Each type of communications traffic is assigned a different priority level or class of service, and each network is characterized in terms of its performance capabilities, utilizing common IP network routing protocols and practices. The capacity of each available communications link assigned to the aircraft is communicated between the Ground Communications Controller 912 and the Aircraft Communications Controllers 910, 911 as part of the new channel assignments communications of step 1218. Routing policies in the various communications controllers 910, 911, 912 assure that the various types of communications (voice, data, control data, etc.) are routed over an appropriate network. As communications channels are reconfigured, these routing capabilities will automatically redirect communications over the newly configured assignments.

Figure 14:
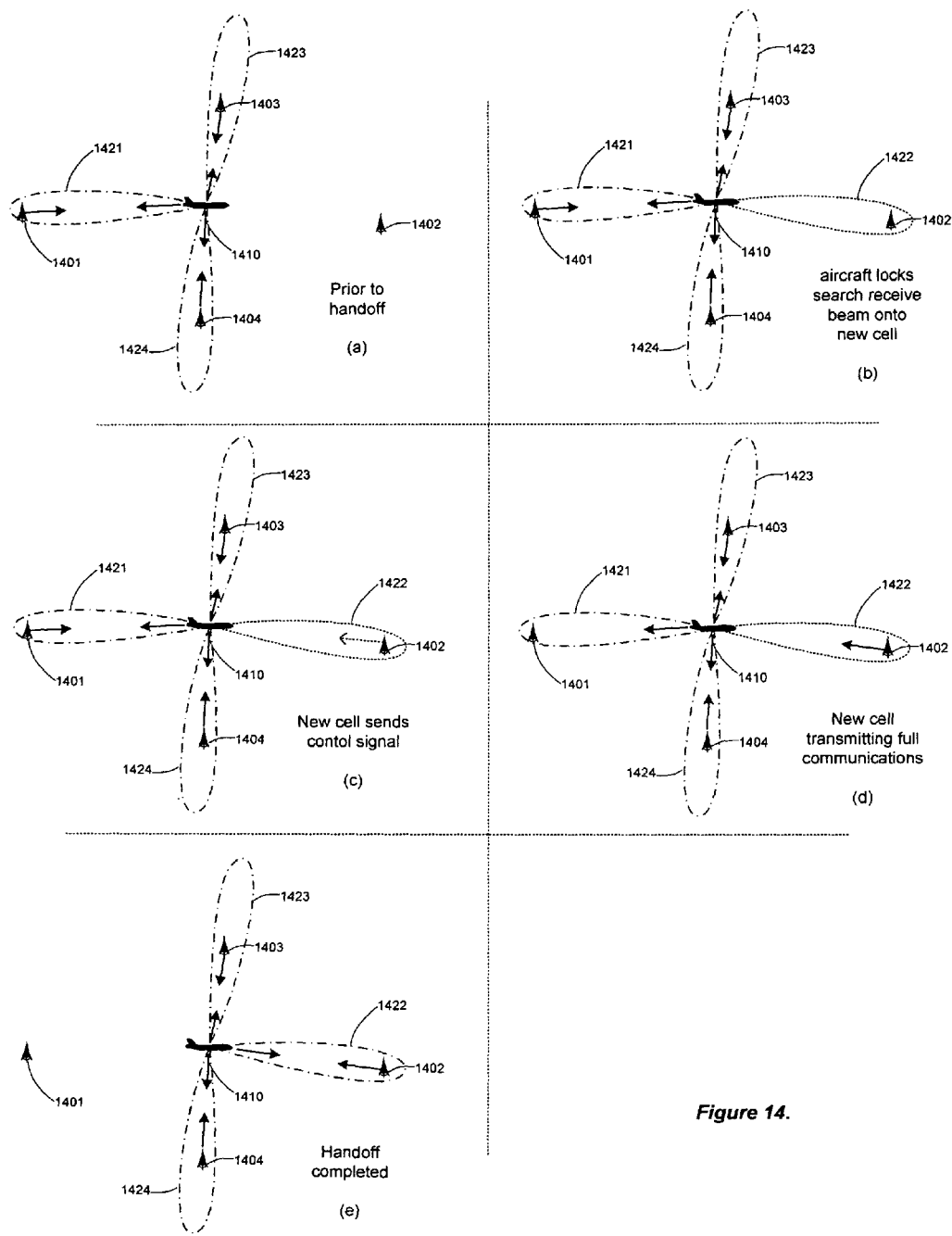
FIGS. 14A-14E illustrate the relationship between one of the terrestrial air-to-ground transceivers on an aircraft the cells presently serving the aircraft and candidate cells.

The new channel assignments communicated in step 18 will include timing information so that all channel re-assignments are completed in a non-conflicting manner. FIG. 14A illustrates the relationship between one of the terrestrial air-to-ground transceivers on aircraft 1410, current serving cells 1401, 1403, 1404 and candidate serving cell 1402 prior to initiation of a handoff of communications between the two cells. The primary beams of the associated antennas 1421, 1423, 1424 are directed at the serving cells, while the search beams (not shown) continued to be used for scanning as previously described. At the designated time, in order execute a handoff from cell 1401 to cell 1402, the search receiver for the transceiver associated with cell 1401 and associated search beam 1422 are directed to the candidate cell, 1402 while the primary receiver, transmitter and associated beam 1420 continue to maintain communications with the serving cell 1401, as illustrated in FIG. 14B. On detecting the pilot signal from the cell 1402, the transceiver signals the ground station controller that it has acquired the new pilot and the ground station controller causes the transceiver to add cell 1402 to its active list, and causes cell 1402 to begin transmission of a control signal, as illustrated in FIG. 14C. On confirmation that the control signal is being received by the aircraft transceiver, the ground station controller causes cell 1402 to commence transmitting as illustrated in FIG. 14D and causes cell 1401 to cease transmitting as illustrated in FIG. 14E. The signals received from both receivers are combined, thereby assuring that there are no lost communications. In an alternative implementation, both cells 1401 and 1402 may transmit the signal for a brief period of time, providing a "make before break" assurance of signal continuity. Once signal continuity has been established on the aircraft receiver from the new cell 1402, the aircraft transceiver commences transmitting on the beam to cell 1402, while restoring the second receiver and beam to search functions. Signals received at the two cells 1401 and 1402 are combined by the ground station controller function, assuring that no communications are lost during the handoff process.

Aircraft Position Communication Scenarios

Figure 15:
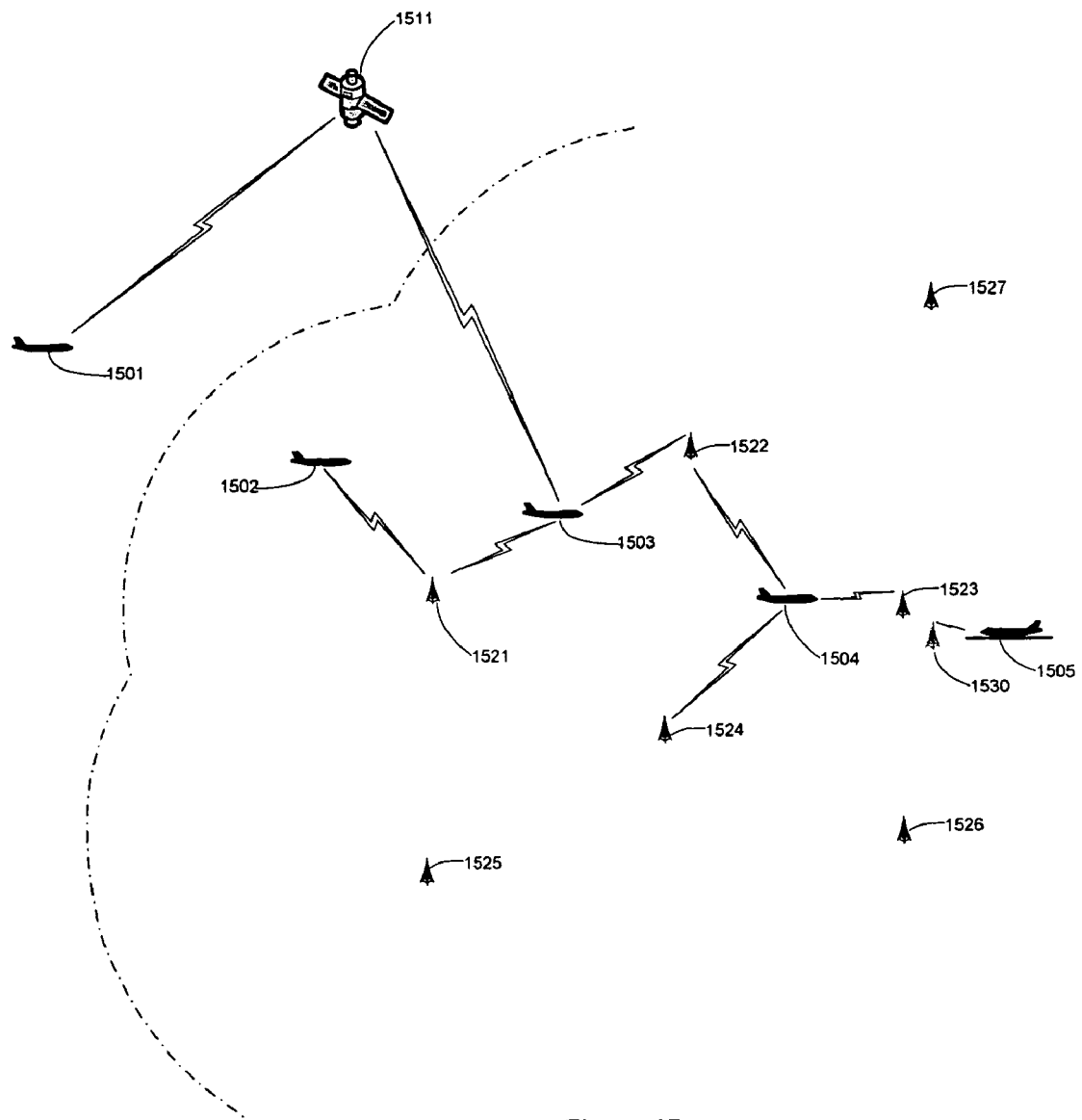
FIG. 15 illustrates a sequence of aircraft positions and some communications scenarios that might be encountered with an air-to-ground cellular network utilizing the capabilities enabled by this invention.

FIG. 15 illustrates a sequence of aircraft positions and some communications scenarios that might be encountered with an air-to-ground cellular network utilizing the capabilities enabled by this invention. Aircraft 1501 is outside the coverage area of the terrestrial air-to-ground system, indicated by service boundary 1510. Service is only available from a satellite air-to-ground cellular network and all aircraft communications are routed via the satellite 1511. Aircraft 1502 is within the coverage area of the terrestrial air-to-ground system, and the Control System directs that all of the traffic be communicated via ground station 1521. While service could be provided from ground stations 1522 or 1525, their greater distance from the aircraft makes ground station 1521 the preferred communications alternative. Aircraft 1503 is midway between ground station 1521 and 1522. In a basic cellular system, an aircraft in this location would be ready to hand over all of the traffic from ground station 1521 to ground station 1522. However, in this air-to-ground system, the communications can be gradually transferred from one ground station to the next, and thus there are communications shown to both ground station 1521 and 1522. Also illustrated is a link from aircraft 1503 the satellite—as might be required if there was an increase in overall communications which exceeded the capacity that could be made available on ground stations 1521 and 1522. Aircraft 1504 is shown with terrestrial air-to-ground communications with three separate ground stations 1522, 1523 and 1524. This illustrates a situation that arises when the total airborne traffic has placed capacity demands on ground stations such that no two of the ground stations within range of the aircraft can meet the total communications demand for the aircraft. Aircraft 1505 is shown on the ground, with service provided by a terrestrial cellular base station 1530 that is located at the airport. Note that immediately prior to landing, aircraft 1505 would have been served by ground station 1523, since it would have been at an altitude that placed other ground stations over the horizon. If the capacity demands on ground station 1523 were such that it could not meet the communications requirements of the aircraft, the control system could have directed use of the satellite air-to-ground system.

SUMMARY

The present handoff management system allows maintaining an optimal configuration of communications connections between aircraft and terrestrial air-to-ground ground stations, satellite air-to-ground cellular networks and terrestrial cellular base stations. Further, it provides control mechanisms to allow prioritization of certain types of traffic to assure that, in the event of insufficient total capacity to meet the offered load of communication requirements to an aircraft; the available capacity is assigned to the highest priority requirement.

What is claimed as new and desired to be protected by Letters Patent of the United States is:

1. A system for managing multiple communications links between an aircraft and at least one terrestrial communication network, comprising:

aircraft network means for communicating with a plurality of wireless subscriber devices that are located in an aircraft; and aircraft communications controller means, located on said aircraft and connected to said aircraft network means, comprising:

transceiver means for communicating with at least one air-to-ground communication network that interconnects with said at least one terrestrial communication network, said air-to-ground communication networks comprising: terrestrial air-to-ground cellular network, satellite air-to-ground cellular network, terrestrial cellular network, each of which air-to-ground communication networks include at least one communication link, and communication controller means for distributing said communications with said plurality of wireless subscriber devices among a plurality of said communication links of selected ones of said air-to-ground communication networks to interconnect said plurality of wireless subscriber devices with said at least one terrestrial communication network.

2. The system for managing multiple communications links between an aircraft and at least one terrestrial communication network of claim 1 further comprising:
   wherein said aircraft network means comprises:
      a plurality of base station means for generating radio frequency communication signals to communicate with at least one of said plurality of wireless subscriber devices that are located in said aircraft; and
   wherein said aircraft communications controller means comprises:
      data concentrator means for converting the subscriber traffic and signaling channels received from said plurality of base station means to an aggregate data stream.

3. The system for managing multiple communications links between an aircraft and at least one terrestrial communication network of claim 2 further comprising:
   a plurality of ground-based base station means for communicating with at least one of said plurality of wireless subscriber devices; and
   data router means for disaggregating said aggregate data stream into a plurality of data streams and delivering each of said plurality of data streams to a corresponding one of said plurality of ground-based base station means.

4. The system for managing multiple communications links between an aircraft and at least one terrestrial communication network of claim 1 wherein said aircraft network means comprises:
   a plurality of base station means to communicate via communications with at least one of said plurality of wireless subscriber devices, each at least one of said plurality of base station means operating in a wireless technology that differs from those of the remaining ones of said plurality of base station means.

5. The system for managing multiple communications links between an aircraft and at least one terrestrial communication network of claim 1 further comprising:
   aircraft LAN means for establishing at least one wireless LAN-based cell site to communicate via data-based communications with at least one of said plurality of wireless subscriber devices.

6. The system for managing multiple communications links between an aircraft and at least one terrestrial communication network of claim 1 wherein said aircraft communications controller means further comprises:
   aircraft interface means for establishing communications between said plurality of wireless subscriber devices and said at least one terrestrial communications network by exchanging both subscriber traffic and at least one of network signaling and administrative data on separate concurrently available logical channels via said at least one air-to-ground communication network.

7. A method for managing multiple communications links between an aircraft and at least one terrestrial communication network, comprising:
   communicating with a plurality of wireless subscriber devices that are located in an aircraft via an aircraft network; and
   communicating with said at least one terrestrial communications network via an aircraft communications controller that is located on said aircraft and connected to said aircraft network, comprising:
      communicating with at least one air-to-ground communication network that interconnects with said at least one terrestrial communication network, said air-to-ground communication networks comprising: terrestrial air-to-ground cellular network, satellite air-to-ground cellular network, terrestrial cellular network, each of which air-to-ground communication networks include at least one communication link, and
      distributing said communications with said plurality of wireless subscriber devices among a plurality of said communication links of selected ones of said air-to-ground communication networks to interconnect said plurality of wireless subscriber devices with said at least one terrestrial communication network.

8. The method for managing multiple communications links between an aircraft and at least one terrestrial communication network of claim 7 further comprising:
   generating radio frequency communication signals in a plurality of base stations to communicate with at least one of said plurality of wireless subscriber devices that are located in said aircraft; and
   converting the subscriber traffic and signaling channels received from said plurality of base stations to an aggregate data stream.

9. The method for managing multiple communications links between an aircraft and at least one terrestrial communication network of claim 7 further comprising:
   communicating with at least one of said plurality of wireless subscriber devices via a plurality of ground-based base stations; and
   disaggregating said aggregate data stream into a plurality of data streams and delivering each of said plurality of data streams to a corresponding one of said plurality of ground-based base stations.

10. The method for managing multiple communications links between an aircraft and at least one terrestrial communication network of claim 1 wherein said step of communicating with a plurality of wireless subscriber devices comprises:
    communicating with at least one of said plurality of wireless subscriber devices via a plurality of base stations, each of said plurality of base stations operating in a wireless technology that differs from those of the remaining ones of said plurality of base stations.

11. The method for managing multiple communications links between an aircraft and at least one terrestrial communication network of claim 7 further comprising:
    establishing at least one wireless LAN-based cell site to communicate via data-based communications with at least one of said plurality of wireless subscriber devices.

12. The method for managing multiple communications links between an aircraft and at least one terrestrial communication network of claim 7 wherein said step of communicating with said at least one terrestrial communications network further comprises:
    establishing communications between said plurality of wireless subscriber devices and said at least one terrestrial communications network by exchanging both subscriber traffic and at least one of network signaling and administrative data on separate concurrently available logical channels via said at least one air-to-ground communication network.

* * * * *